United States Patent
Crouch et al.

(10) Patent No.: US 10,838,045 B2
(45) Date of Patent: Nov. 17, 2020

(54) METHOD AND SYSTEM FOR OPTIMIZING SCANNING OF COHERENT LIDAR

(71) Applicant: BLACKMORE SENSORS & ANALYTICS, LLC, Palo Alto, CA (US)

(72) Inventors: Stephen C. Crouch, Bozeman, MT (US); Edward Joseph Angus, Bozeman, MT (US); Michelle Milvich, Livingston, MT (US)

(73) Assignee: BLACKMORE SENSORS & ANALYTICS, LLC., Palo Alto, CA (US)

( * ) Notice: Subject to any disclaimer, the term of this patent is extended or adjusted under 35 U.S.C. 154(b) by 0 days.

(21) Appl. No.: 16/590,316

(22) Filed: Oct. 1, 2019

(65) Prior Publication Data
US 2020/0326427 A1    Oct. 15, 2020

Related U.S. Application Data

(60) Provisional application No. 62/739,915, filed on Oct. 2, 2018.

(51) Int. Cl.
*G01S 7/481* (2006.01)
*G01S 17/931* (2020.01)
(Continued)

(52) U.S. Cl.
CPC .......... *G01S 7/4817* (2013.01); *G01S 7/481* (2013.01); *G01S 13/426* (2013.01);
(Continued)

(58) Field of Classification Search
CPC ...... G01S 7/4817; G01S 17/931; G01S 7/481; G01S 13/426; G01S 13/428; G01S 17/00; G01S 17/02; G01S 17/88; G01S 17/933
(Continued)

(56) References Cited

U.S. PATENT DOCUMENTS 4,039,246 A * 8/1977 Voigt .................... F41G 7/2213
  359/220.1
4,413,177 A * 11/1983 Godwin, Jr. .......... F41G 7/2213
  244/3.16
(Continued)

FOREIGN PATENT DOCUMENTS

DE    102004050682    6/2005
WO    WO-2018/107237 A1    6/2018

OTHER PUBLICATIONS

International Search Report and Written Opinion re Application No. PCT/US2019/054146 dated Jan. 7, 2020; 12 pages.

*Primary Examiner* — George G King
(74) *Attorney, Agent, or Firm* — Foley & Lardner LLP

(57) ABSTRACT

An apparatus include a motor, a first scanner, and a second scanner. The first scanner is coupled to the motor, and the motor is configured to rotate the first scanner at a first angular velocity about a rotation axis to deflect a first beam incident in a third plane on the first scanner into a first plane different from the third plane. The second scanner is coupled to the motor, and the motor is configured to rotate the second scanner at a second angular velocity different from the first angular velocity about the rotation axis to deflect a second beam incident in the third plane on the second scanner into a second plane different from the third plane.

20 Claims, 22 Drawing Sheets

(51) Int. Cl.
   *G01S 17/88* (2006.01)
   *G01S 13/42* (2006.01)
   *G01S 17/02* (2020.01)
   *G01S 17/933* (2020.01)
   *G01S 17/00* (2020.01)

(52) U.S. Cl.
   CPC ............ *G01S 13/428* (2013.01); *G01S 17/00* (2013.01); *G01S 17/02* (2013.01); *G01S 17/88* (2013.01); *G01S 17/931* (2020.01); *G01S 17/933* (2013.01)

(58) Field of Classification Search
   USPC .......... 359/204.1, 212.1–217.2, 220.1–226.2
   See application file for complete search history.

(56) References Cited

U.S. PATENT DOCUMENTS

| | | | |
|---|---|---|---|
| 5,000,529 A * | 3/1991 | Katoh | G02B 5/09 235/462.39 |
| 5,198,919 A * | 3/1993 | Reeder | G02B 26/108 359/216.1 |
| 5,914,479 A * | 6/1999 | Fikes | G02B 26/105 235/454 |
| 6,292,285 B1 * | 9/2001 | Wang | G02B 5/09 347/243 |
| 1,006,102 A1 | 8/2018 | Slobodyanyuk et al. | |
| 10,303,044 B2 * | 5/2019 | Morarity | G02B 26/122 |
| 2016/0274589 A1 | 9/2016 | Templeton | |
| 2017/0219696 A1 | 8/2017 | Hayakawa | |
| 2017/0299697 A1 | 10/2017 | Swanson | |
| 2019/0277962 A1 * | 9/2019 | Ingram | G01S 13/86 |

* cited by examiner

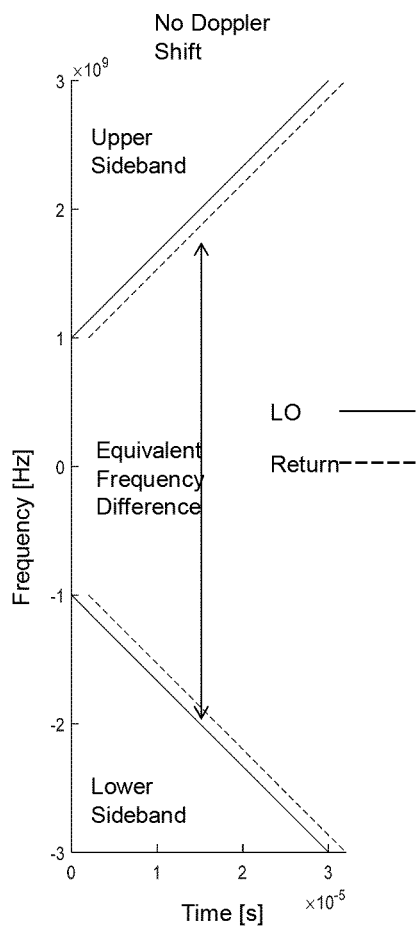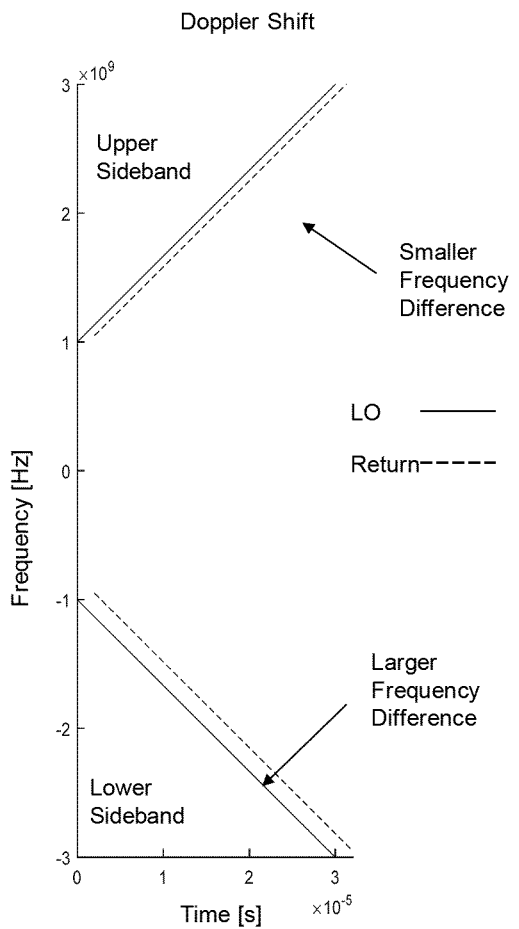

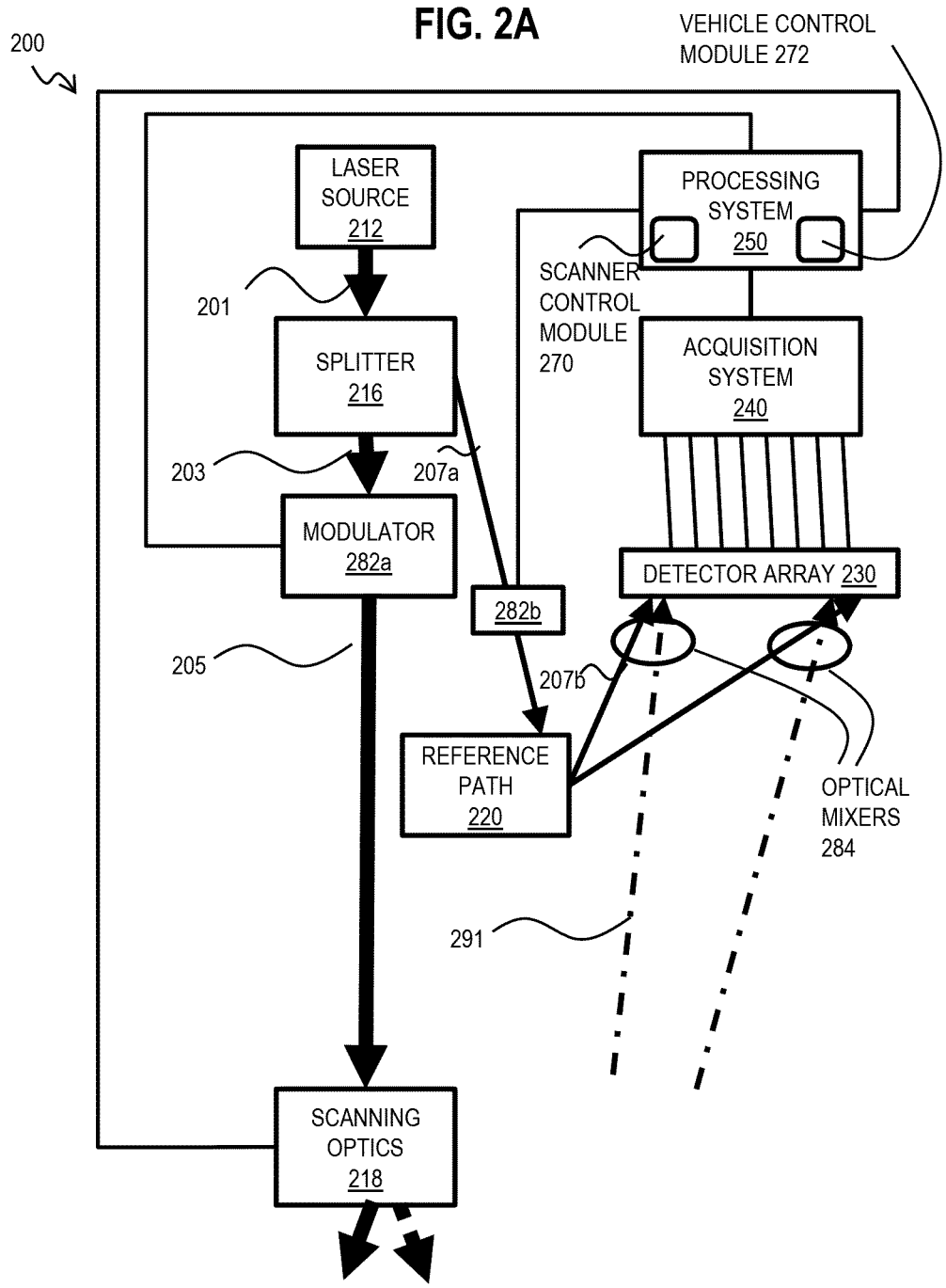

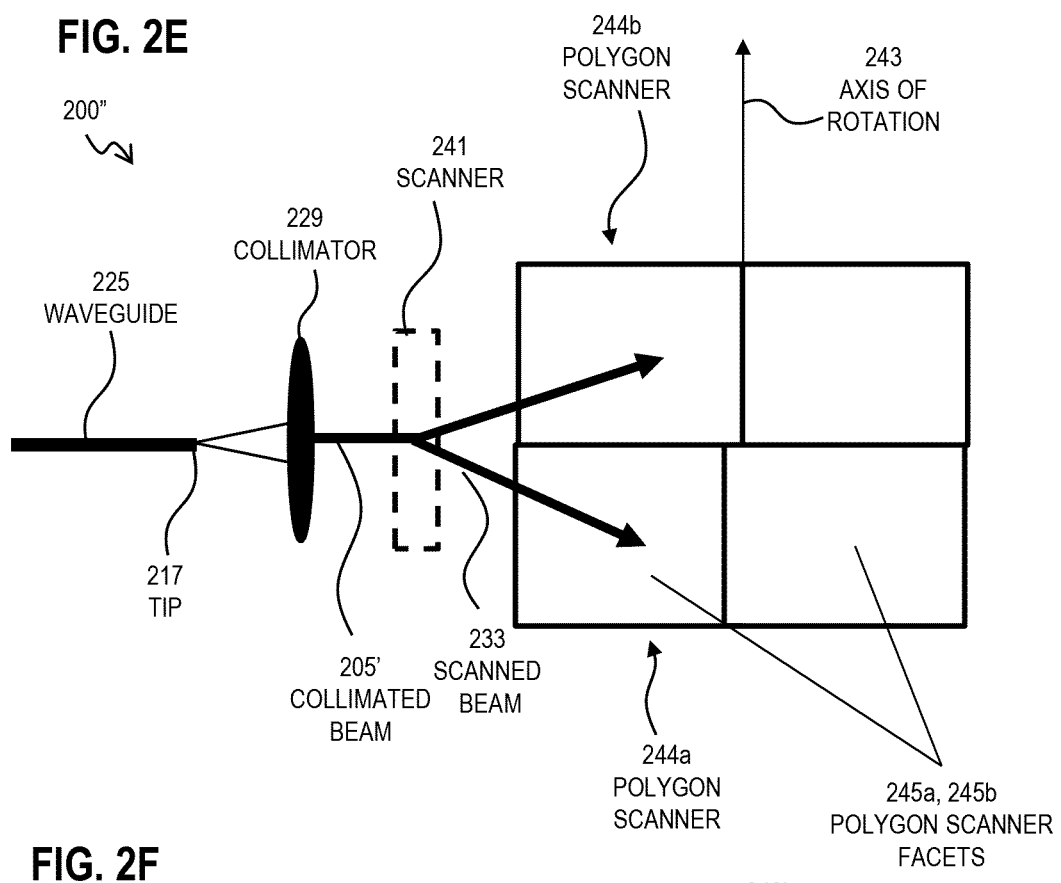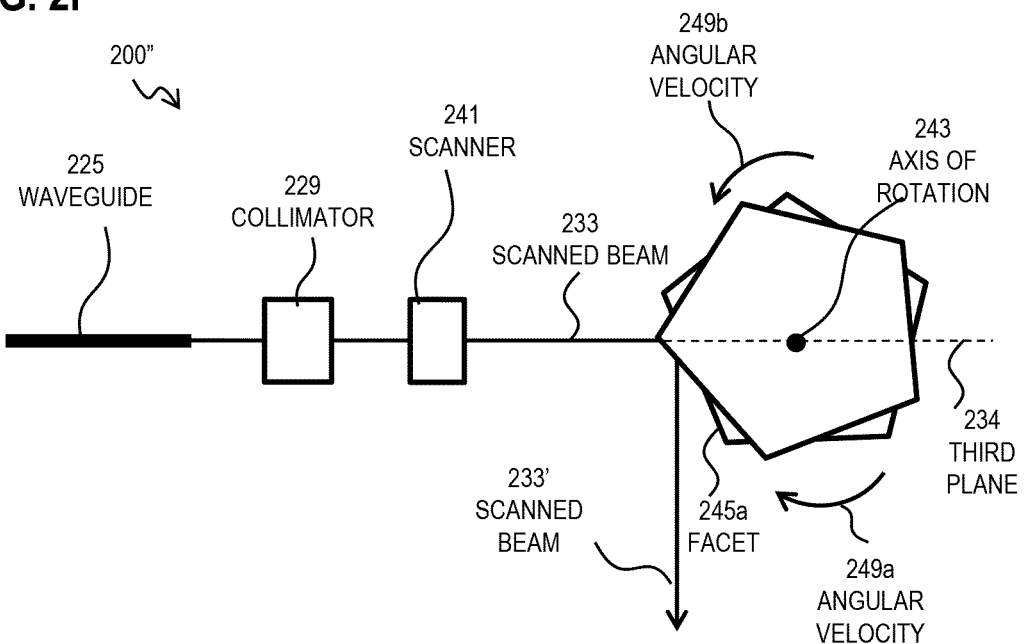

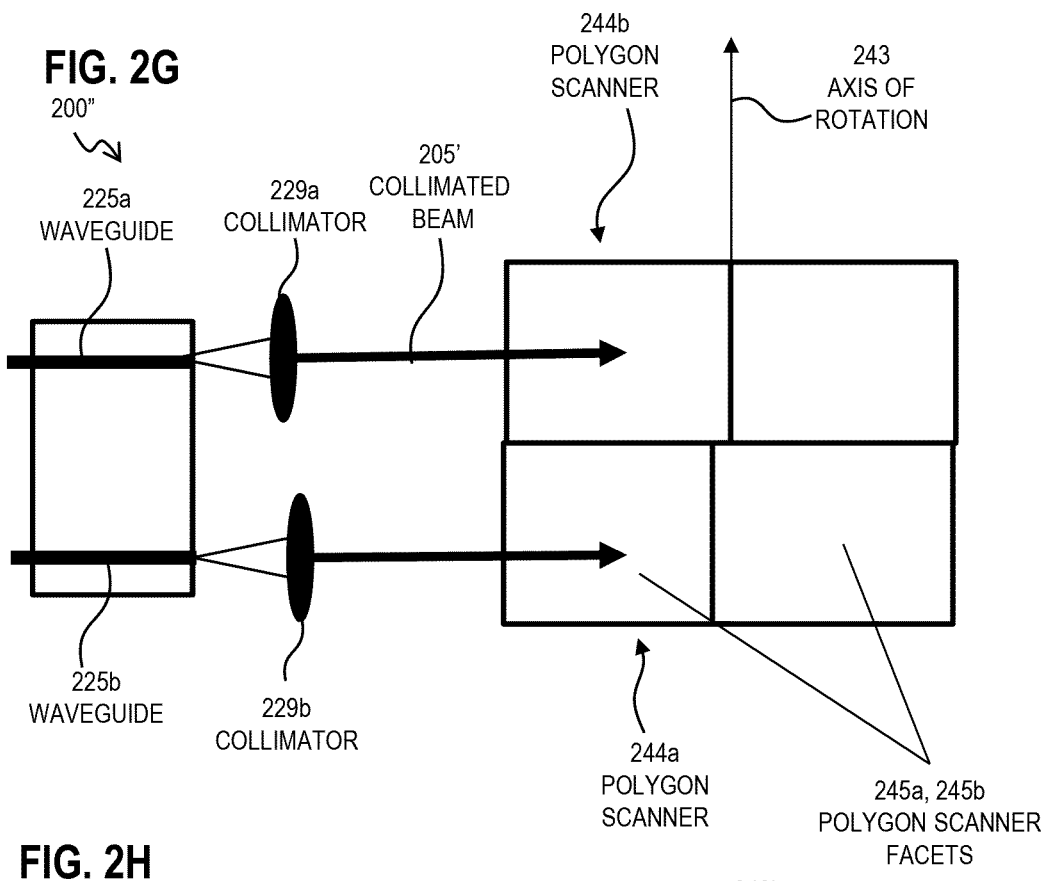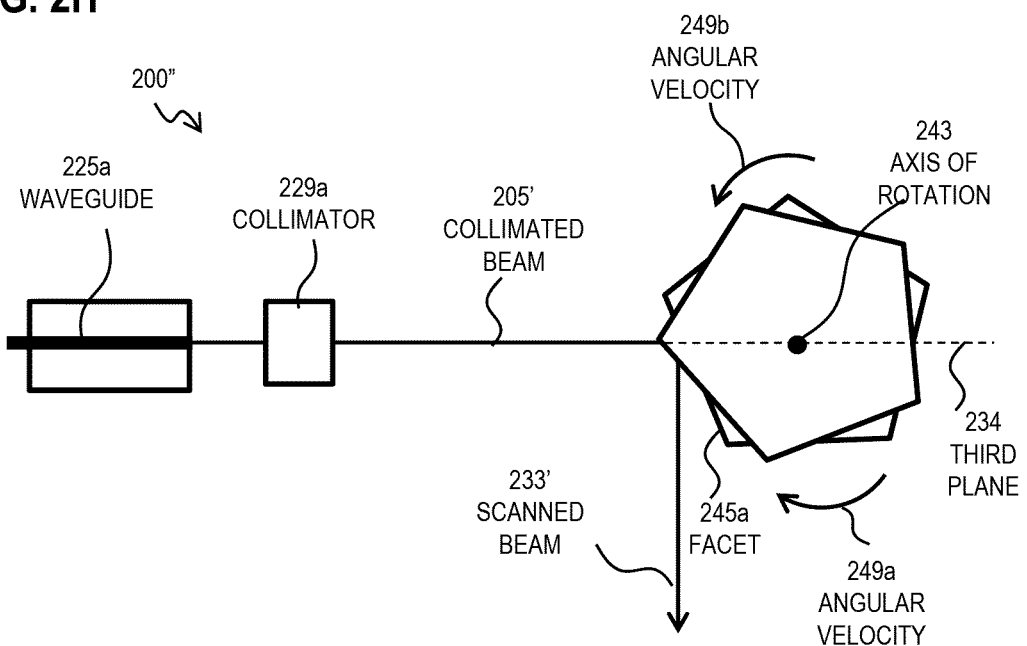

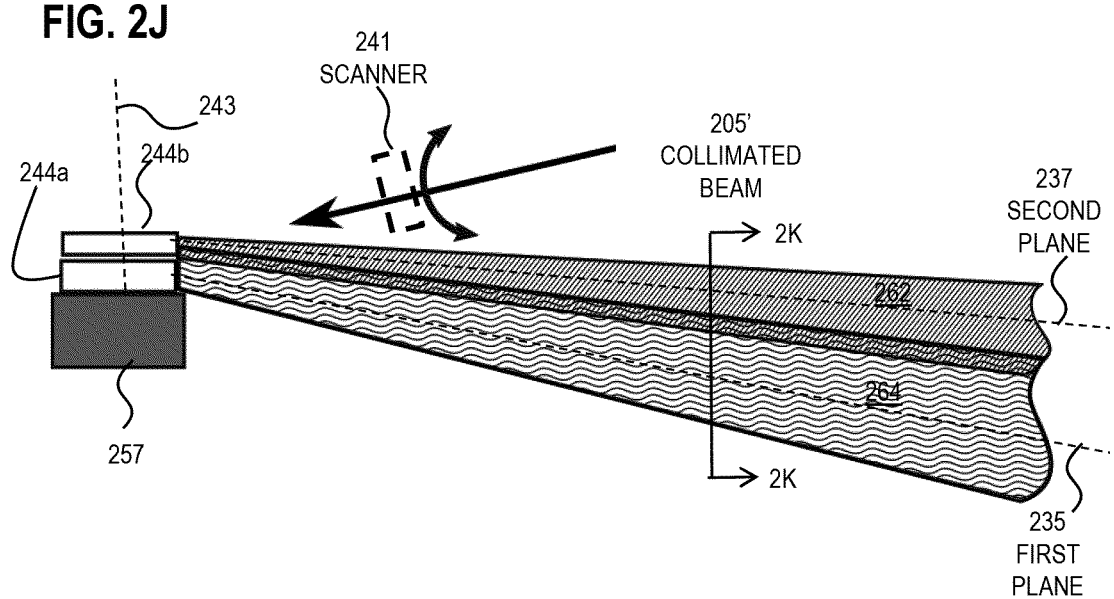
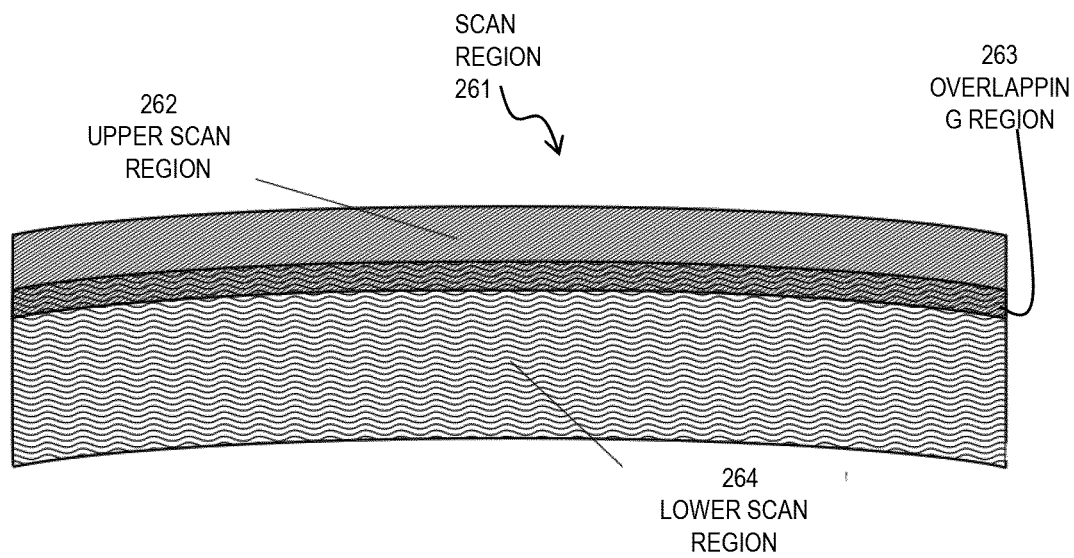

METHOD AND SYSTEM FOR OPTIMIZING SCANNING OF COHERENT LIDAR

CROSS-REFERENCE TO RELATED APPLICATIONS

The present application claims the benefit of and priority to U.S. Provisional Application No. 62/739,915, filed Oct. 2, 2018, the entire disclosure of which is incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR).

SUMMARY

At least one aspect relates to an apparatus. The apparatus includes a motor, a first scanner, and a second scanner. The first scanner is coupled to the motor, and the motor is configured to rotate the first scanner at a first angular velocity about a rotation axis to deflect a first beam incident in a third plane on the first scanner into a first plane different from the third plane. The second scanner is coupled to the motor, and the motor is configured to rotate the second scanner at a second angular velocity different from the first angular velocity about the rotation axis to deflect a second beam incident in the third plane on the second scanner into a second plane different from the third plane.

At least one aspect relates to a system. The system includes a laser source, at least one waveguide, at least one collimator, a motor, a first scanner, and a second scanner. The at least one waveguide is configured to receive a third beam from the laser source and emit the third beam at a tip of the at least one waveguide. The at least one collimator is configured to collimate the third beam from each respective at least one waveguide into a third plane. The first scanner is coupled to the motor, and the motor is configured to rotate the first scanner to deflect a first beam corresponding to the third beam into a first plane different from the third plane. The second scanner is coupled to the motor, and the motor is configured to rotate the second scanner to deflect a second beam corresponding to the third beam into a second plane different from the third plane.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1E is a graph using a symmetric LO signal, and shows the return signal in this frequency time plot as a dashed line when there is no Doppler shift, according to an embodiment;

FIG. 1F is a graph similar to FIG. 1E, using a symmetric LO signal, and shows the return signal in this frequency time plot as a dashed line when there is a non zero Doppler shift, according to an embodiment;

FIG. 2A is a block diagram that illustrates example components of a high resolution (hi res) LIDAR system, according to an embodiment;

FIG. 2E is a block diagram that illustrates a side view of example components of a high resolution (hi res) LIDAR system, according to an embodiment;

FIG. 2F is a block diagram that illustrates a top view of the example components of the high resolution (hi res) LIDAR system of FIG. 2E, according to an embodiment;

FIG. 2G is a block diagram that illustrates a side view of example components of a high resolution (hi res) LIDAR system, according to an embodiment;

FIG. 2H is a block diagram that illustrates a top view of the example components of the high resolution (hi res) LIDAR system of FIG. 2G, according to an embodiment;

FIG. 2J is a schematic diagram that illustrates a side view of multiple beams scanned in multiple scan regions of the system of FIG. 2E, according to an embodiment;

FIG. 2K is a schematic diagram that illustrates a cross sectional view of the multiple scan regions of FIG. 2J taken along the line 2K-2K;

DETAILED DESCRIPTION

Figure 1A:
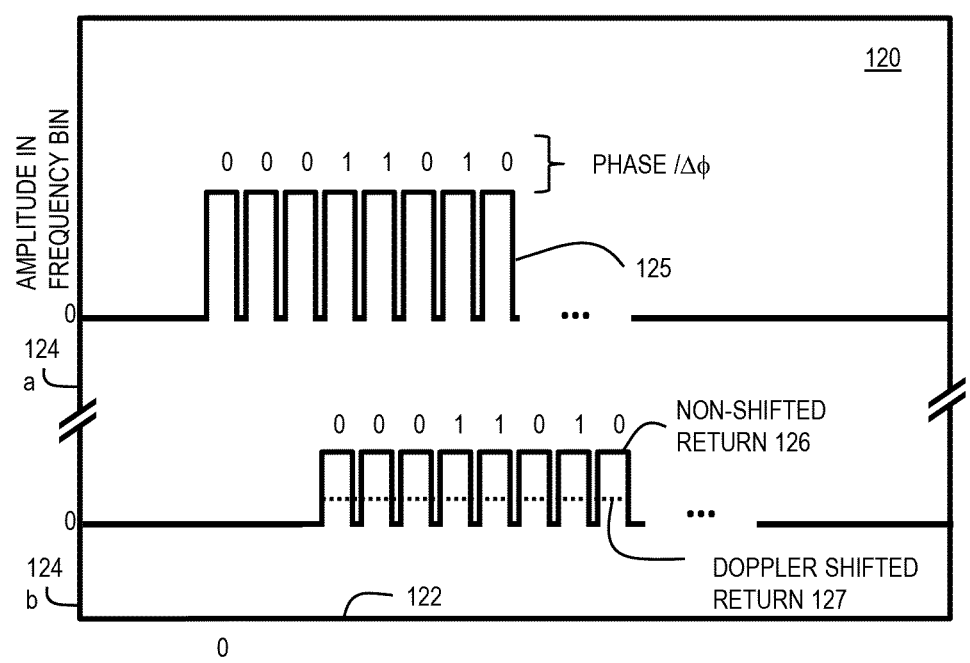
FIG. 1A is a schematic graph that illustrates the example transmitted signal of a series of binary digits along with returned optical signals for measurement of range, according to an embodiment.

A method and apparatus and system and computer-readable medium are described for scanning of LIDAR to support operation of a vehicle. Some embodiments are described below in the context of a single front mounted hi-res Doppler LIDAR system on a personal automobile; but, embodiments are not limited to this context. In other embodiments, one or multiple systems of the same type or other high resolution LIDAR, with or without Doppler components, with overlapping or non-overlapping fields of view or one or more such systems mounted on smaller or larger land, sea or air vehicles, piloted or autonomous, are employed.

The sampling and processing that provides range accuracy and target speed accuracy involve integration of one or more laser signals of various durations, in a time interval called integration time. To cover a scene in a timely way involves repeating a measurement of sufficient accuracy (involving one or more signals often over one to tens of microseconds) often enough to sample a variety of angles (often on the order of thousands) around the autonomous vehicle to understand the environment around the vehicle before the vehicle advances too far into the space ahead of the vehicle (a distance on the order of one to tens of meters, often covered in a particular time on the order of one to a few seconds). The number of different angles that can be covered in the particular time (often called the cycle or sampling time) depends on the sampling rate. To improve detection of an environment around a vehicle, one or more scanners may be controlled to rotate based on parameters including at least one of integration time for range, speed accuracy, sampling rate, or pattern of sampling different angles. In particular, a tradeoff can be made between integration time for range and speed accuracy, sampling rate, and pattern of sampling different angles, with one or more LIDAR beams, to effectively determine the environment in the vicinity of an autonomous vehicle as the vehicle moves through that environment. Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

A method can include generating, with a LIDAR system including a laser source and a waveguide, a beam emitted from a tip of the waveguide. The method also includes shaping, with a collimator, the beam incident in a third plane on one of a first polygon scanner and a second polygon scanner of the LIDAR system. The method also includes adjusting, with the first polygon scanner, a direction of the beam in a first plane different from the third plane from a first angle to a second angle within the first plane based on rotation of the first polygon scanner about a rotation axis with a first angular velocity. The method also includes receiving, at the tip of the waveguide, a plurality of first return beams based on the adjusting of the beam in the first plane to encompass a first scan region of a target positioned at a first range. The method also includes adjusting, with the second polygon scanner, a direction of the beam in a second plane different from the third plane from a first angle to a second angle within the second plane based on rotation of the second polygon scanner about the rotation axis with a second angular velocity different than the first angular velocity. The method also includes receiving, at the tip of the waveguide, a plurality of second return beams based on the adjusting of the beam in the second plane to encompass a second scan region of a target positioned at a second range different from the first range.

A method can include receiving, on a processor, first data that indicates first signal-to-noise ratio (SNR) values of a signal reflected by a target and detected by the LIDAR system based on values of a range of the target, where the first SNR values are for a respective value of a scan rate of the LIDAR system. The first data also indicates second signal-to-noise ratio (SNR) values of the signal based on values of the range of the target, where the second SNR values are for a respective value of an integration time of the LIDAR system. The first data also indicates a first angle and a second angle that defines an angle range of the scan pattern. The method also includes receiving, on the processor, second data that indicates a first maximum design range of the target at each angle in the angle range for a first scan region and a second maximum design range of the target at each angle in the angle for a second scan region different than the first scan region. The method also includes for each angle in the angle range of the first scan region, determining, on the processor, a first maximum scan rate of the LIDAR system based on a maximum value among those scan rates where the first SNR value based on the first maximum design range is greater than a minimum SNR threshold. The method also includes for each angle in the angle range of the second scan region, determining, on the processor, a second maximum scan rate of the LIDAR system based on a maximum value among those scan rates where the first SNR value based on the second maximum design range is greater than a minimum SNR threshold. The method also includes for each angle in the angle range of the first scan region, determining, on the processor, a first minimum integration time of the LIDAR system based on a minimum value among those integration times where the second SNR value based on the first maximum design range is greater than the minimum SNR threshold. The method also includes for each angle in the angle range of the second scan region, determining, on the processor, a second minimum integration time of the LIDAR system based on a minimum value among those integration times where the second SNR value based on the second maximum design range is greater than the minimum SNR threshold. The method also includes defining, with the processor, the scan pattern for the first scan region of the LIDAR system based on the first maximum scan rate and the first minimum integration time at each angle in the angle range of the first scan region. The method also includes defining, with the processor, the scan pattern for the second scan region of the LIDAR system based on the second maximum scan rate and the second minimum integration time at each angle in the angle range of the first scan region. The method also includes operating the LIDAR system according to the scan pattern for the first scan region and the second scan region.

1. Phase-Encoded Detection Overview

Using an optical phase-encoded signal for measurement of range, the transmitted signal is in phase with a carrier (phase=0) for part of the transmitted signal and then changes by one or more phases changes represented by the symbol $\Delta\phi$ (so phase=$\Delta\phi$) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi^*\{0, 1, 2$ and $3\}$, which, for $\Delta\phi=\pi/2$ (90 degrees), equals $\{0, \pi/2, \pi$ and $3\pi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement in communications applications than ordinary PSK, since there is no need for the demodulator to have a copy of the reference signal to determine the exact phase of the received signal (thus, it is a non-coherent scheme).

To achieve acceptable range accuracy and detection sensitivity, direct long range LIDAR systems may use short pulse lasers with low pulse repetition rate and extremely high pulse peak power. The high pulse power can lead to rapid degradation of optical components. Chirped and phase-encoded LIDAR systems may use long optical pulses with relatively low peak optical power. In this configuration, the range accuracy can increase with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. With respect to LIDAR, using the same modulated optical carrier as a reference signal that is combined with the returned signal at an optical detector can produce in the resulting electrical signal a relatively low beat frequency in the RF band that is proportional to the difference in frequencies or phases between the references and returned optical signals. This kind of beat frequency detection of frequency differences at a detector is called heterodyne detection, which can enable using RF components of ready and inexpensive availability.

High resolution range-Doppler LIDAR systems can use an arrangement of optical components and coherent processing to detect Doppler shifts in returned signals to provide improved range and relative signed speed on a vector between the LIDAR system and each external object.

In some instances, these improvements provide range, with or without target speed, in a pencil thin laser beam of proper frequency or phase content. When such beams are swept over a scene, information about the location and speed of surrounding objects can be obtained. This information can be used in control systems for autonomous vehicles, such as self driving, or driver assisted, automobiles.

For optical ranging applications, since the transmitter and receiver are in the same device, coherent PSK can be used. The carrier frequency is an optical frequency fc and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus a strong correlation between the transmitted and returned signal can be a strong indication of a reflected or backscattered signal. The transmitted signal is made up of one or more blocks of symbols, where each block is sufficiently long to provide strong correlation with a reflected or backscattered return even in the presence of noise. The transmitted signal can be made up of M blocks of N symbols per block, where M and N are non-negative integers.

FIG. 1A is a schematic graph 120 that illustrates the example transmitted signal as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency fc+$f_0$ in arbitrary units relative to zero. The vertical axis 124b indicates amplitude of an optical returned signal at frequency fc+$f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+$f_0$ and is not well detected in the expected frequency band, so the amplitude is diminished.

The observed frequency f' of the return differs from the correct frequency f=fc+$f_0$ of the return by the Doppler effect given by Equation 1.

$$f' = \frac{(c + v_o)}{(c + v_s)} f \qquad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, $\Delta f = f' - f$, is the Doppler shift, $\Delta f_D$, which causes problems for the range measurement, and is given by Equation 2.

$$\Delta f_D = \left[\frac{(c + v_o)}{(c + v_s)} - 1\right] f \qquad (2)$$

Note that the magnitude of the error increases with the frequency f of the signal. Note also that for a stationary LIDAR system ($v_o$=0), for an object moving at 10 meters a second ($v_s$=10), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

In phase coded ranging, the arrival of the phase coded reflection can be detected in the return by cross correlating the transmitted signal or other reference signal with the returned signal, which can be implemented by cross correlating the code for a RF signal with an electrical signal from an optical detector using heterodyne detection and thus down-mixing back to the RF band. Cross correlation for any one lag can be computed by convolving the two traces, such as by multiplying corresponding values in the two traces and summing over all points in the trace, and then repeating for each time lag. The cross correlation can be accomplished by a multiplication of the Fourier transforms of each of the two traces followed by an inverse Fourier transform. Forward and inverse Fast Fourier transforms (FFTs) can be efficiently implemented in hardware and software.

Note that the cross correlation computation may be done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R = c^* \Delta t/2 \qquad (3)$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined and range R is not as readily produced.

Figure 1B:
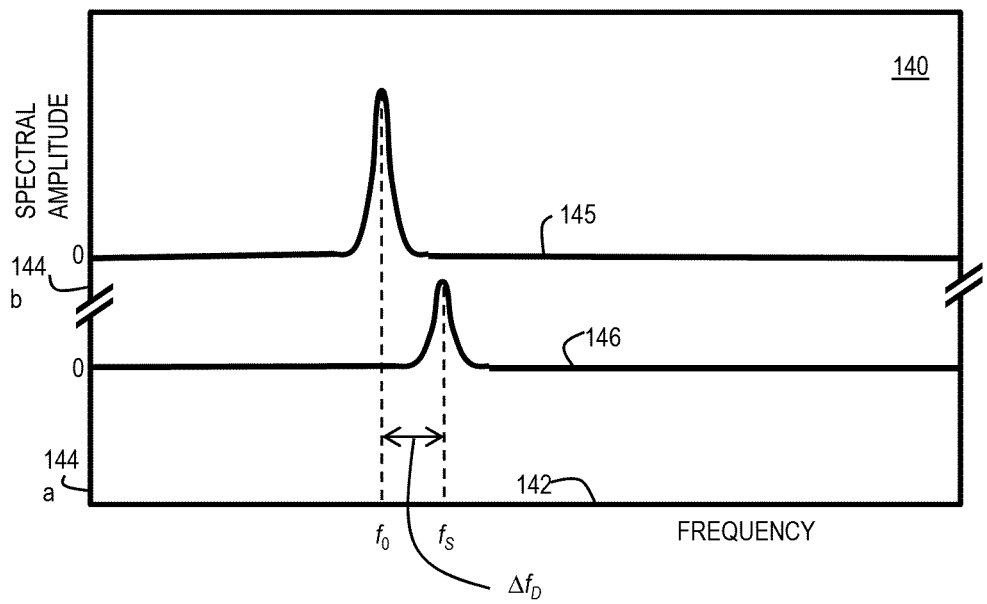
FIG. 1B is a schematic graph that illustrates an example spectrum of the reference signal and an example spectrum of a Doppler shifted return signal, according to an embodiment.

The Doppler shift can be determined in the electrical processing of the returned signal, and can be used to correct the cross correlation calculation. Thus a peak can be more readily found and range can be more readily determined. FIG. 1B is a schematic graph 140 that illustrates an example spectrum of the transmitted signal and an example spectrum of a Doppler shifted complex return signal, according to an embodiment. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF $f_0$; but, instead, is blue shifted by $\Delta f_D$ to a shifted frequency $f_S$. In practice, a complex return representing both in-phase and quadrature (I/Q) components of the return is used to determine the peak at +$f_D$, thus the direction of the Doppler shift, and the direction of motion of the target on the vector between the sensor and the object, can be detected from a single return.

Figure 1C:
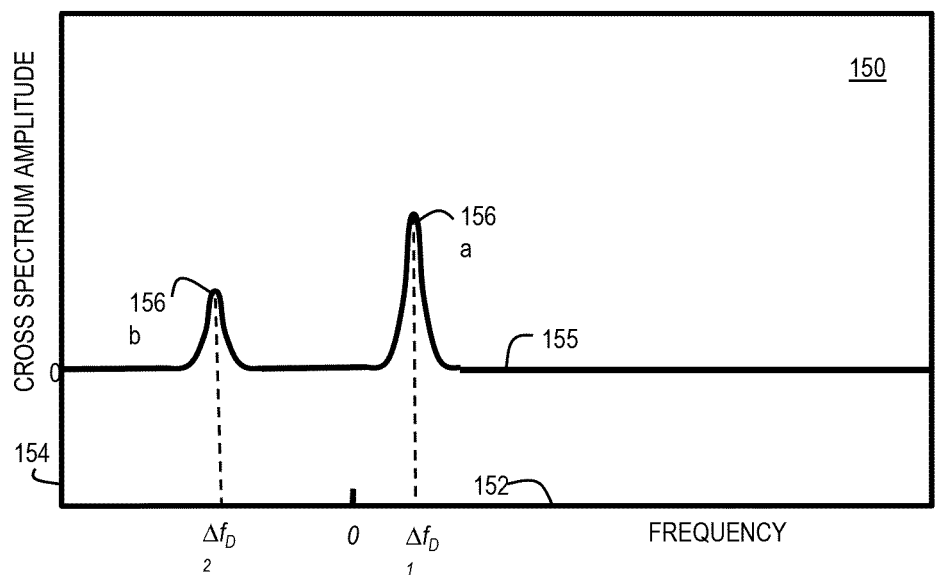
FIG. 1C is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1B, it can be more efficient to take the cross spectrum of the in-phase and quadrature component of the down-mixed returned signal in the RF band. FIG. 1C is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1} = \Delta f_D$ in FIG. 1B) and a second object moving away from the LIDAR system (red shift of $\Delta f_{D2}$). A peak 156a occurs when one of the components is blue shifted $\Delta f_{D1}$; and, another peak 156b occurs when one of the components is red shifted $\Delta f_{D2}$. Thus the Doppler shifts are determined. These shifts can be used to determine a signed velocity of approach of objects in the vicinity of the LIDAR, such as for collision avoidance applications. However, if I/Q processing is not done, peaks may appear at both $+/-\Delta f_{D1}$ and both $+/-\Delta f_{D2}$, so there may be ambiguity on the sign of the Doppler shift and thus the direction of movement.

The Doppler shift(s) detected in the cross spectrum can be used to correct the cross correlation so that the peak 135 is apparent in the Doppler compensated Doppler shifted return at lag $\Delta t$, and range R can be determined. In some embodiments, simultaneous I/Q processing can be performed. In some embodiments, serial I/Q processing can be used to determine the sign of the Doppler return. In some embodiments, errors due to Doppler shifting can be tolerated or ignored; and, no Doppler correction is applied to the range measurements.

2. Chirped Detection Overview

Figure 1D:
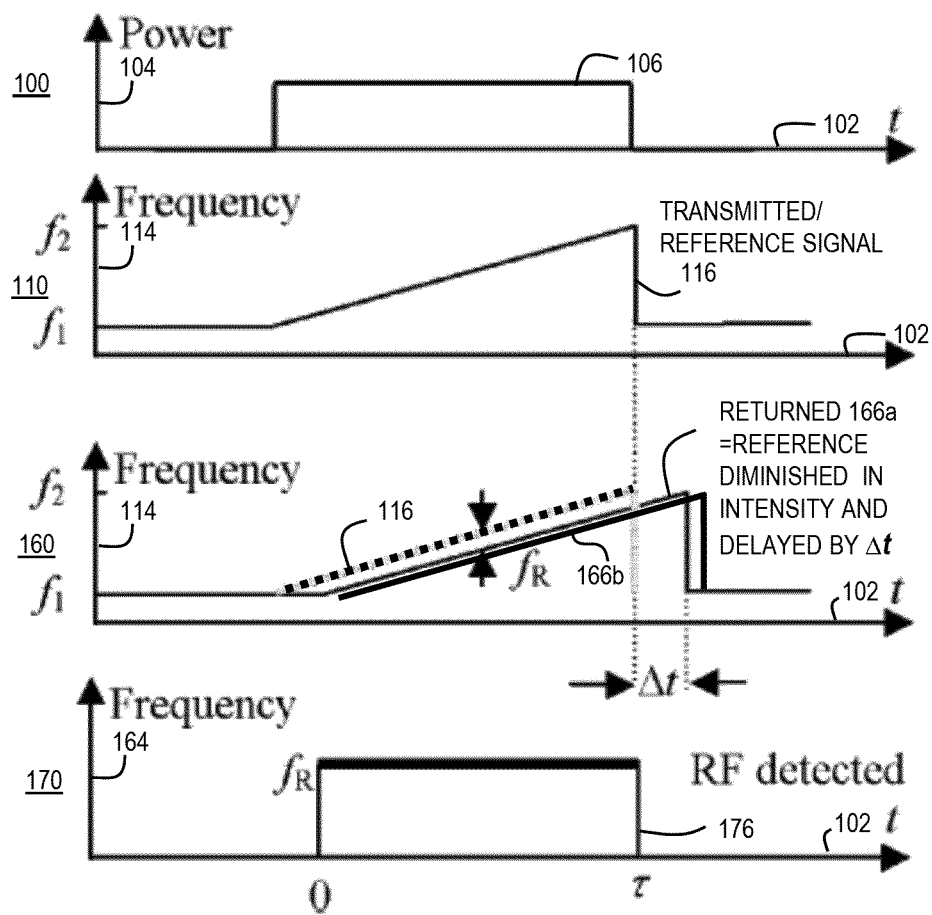
FIG. 1D is a set of graphs that illustrates an example optical chirp measurement of range, according to an embodiment.

FIG. 1D is a set of graphs that illustrates an example optical chirp measurement of range, according to an embodiment. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, $\tau$ starting at time 0. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration $\tau$ of the pulse, and thus has a bandwidth B=$f_2-f_1$. The frequency rate of change is $(f_2-f_1)/\tau$.

The returned signal is depicted in graph 160 which has a horizontal axis 102 that indicates time and a vertical axis 114 that indicates frequency as in graph 110. The chirp (e.g., trace 116) of graph 110 is also plotted as a dotted line on graph 160. A first returned signal is given by trace 166a, which can represent the transmitted reference signal diminished in intensity (not shown) and delayed by $\Delta t$. When the returned signal is received from an external object after covering a distance of 2R, where R is the range to the target, the returned signal start at the delayed time $\Delta t$ can be given by 2R/c, where c is the speed of light in the medium (approximately $3 \times 10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R=(f_2-f_1)/\tau * 2R/c=2BR/c\tau \quad (4a)$$

The value of $f_R$ can be measured by the frequency difference between the transmitted signal 116 and returned signal 166a in a time domain mixing operation referred to as de-chirping. So the range R is given by Equation 4b.

$$R=f_R c\tau/2 \quad B \quad (4b)$$

If the returned signal arrives after the pulse is completely transmitted, that is, if 2R/c is greater than $\tau$, then Equations 4a and 4b are not valid. In this case, the reference signal can be delayed a known or fixed amount to ensure the returned signal overlaps the reference signal. The fixed or known delay time of the reference signal can be multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot illuminated (pencil beam cross section) by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value of $f_R$ that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much expanded scale. Trace 176 depicts the constant frequency $f_R$ measured in response to the transmitted chirp, which indicates a particular range as given by Equation 4b. The second returned signal 166b, if present, would give rise to a different, larger value of $f_R$ (not shown) during de-chirping; and, as a consequence yield a larger range using Equation 4b.

De-chirping can be performed by directing both the reference optical signal and the returned optical signal to the same optical detector. The electrical output of the detector may be dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals can be processed by RF components, such as a Fast Fourier Transform (FFT) algorithm running on a microprocessor or a specially built FFT or other digital signal processing (DSP) integrated circuit. The return signal can be mixed with a continuous wave (CW) tone acting as the local oscillator (versus a chirp as the local oscillator). This leads to the detected signal which itself is a chirp (or whatever waveform was transmitted). In this case the detected signal can undergo matched filtering in the digital domain, though the digitizer bandwidth requirement may generally be higher. The positive aspects of coherent detection are otherwise retained.

In some embodiments, the LIDAR system is changed to produce simultaneous up and down chirps. This approach can eliminate variability introduced by object speed differences, or LIDAR position changes relative to the object which actually does change the range, or transient scatterers in the beam, among others, or some combination. The approach may guarantee that the Doppler shifts and ranges measured on the up and down chirps are indeed identical and can be most usefully combined. The Doppler scheme may guarantee parallel capture of asymmetrically shifted return pairs in frequency space for a high probability of correct compensation.

FIG. 1E is a graph using a symmetric LO signal, and shows the return signal in this frequency time plot as a dashed line when there is no Doppler shift, according to an embodiment. The horizontal axis indicates time in example units of $10^{-5}$ seconds (tens of microseconds). The vertical axis indicates frequency of the optical transmitted signal relative to the carrier frequency $f_c$ or reference signal in example units of GigaHertz ($10^9$ Hertz). During a pulse duration, a light beam comprising two optical frequencies at any time is generated. One frequency increases from $f_1$ to $f_2$ (e.g., 1 to 2 GHz above the optical carrier) while the other frequency simultaneously decreases from $f_4$ to $f_3$ (e.g., 1 to 2 GHz below the optical carrier) The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1 < f_2 < f_p < f_3 < f_4$. As illustrated, the higher frequencies can provide the up chirp and the lower frequencies can provide the down chirp. In some embodiments, the higher frequencies produce the down chirp and the lower frequencies produce the up chirp.

In some embodiments, two different laser sources are used to produce the two different optical frequencies in each beam at each time. In some embodiments, a single optical carrier is modulated by a single RF chirp to produce symmetrical sidebands that serve as the simultaneous up and down chirps. In some embodiments, a double sideband Mach-Zehnder intensity modulator is used that, in general, may not leave much energy in the carrier frequency; instead, almost all of the energy goes into the sidebands.

As a result of sideband symmetry, the bandwidth of the two optical chirps can be the same if the same order sideband is used. In some embodiments, other sidebands are used, e.g., two second order sideband are used, or a first order sideband and a non-overlapping second sideband is used, or some other combination.

When selecting the transmit (TX) and local oscillator (LO) chirp waveforms, it can be advantageous to ensure that the frequency shifted bands of the system take maximum advantage of available digitizer bandwidth. In general this can be accomplished by shifting either the up chirp or the down chirp to have a range frequency beat close to zero.

FIG. 1F is a graph similar to FIG. 1E, using a symmetric LO signal, and shows the return signal in this frequency time plot as a dashed line when there is a nonzero Doppler shift. In the case of a chirped waveform, the time separated I/Q processing (aka time domain multiplexing) can be used to overcome hardware requirements of other approaches. In that case, an AOM can be used to break the range-Doppler ambiguity for real valued signals. In some embodiments, a scoring system can be used to pair the up and down chirp returns. In some embodiments, UQ processing can be used to determine the sign of the Doppler chirp.

3. Optical Detection Hardware Overview

FIG. 2A is a block diagram that illustrates example components of a high resolution range LIDAR system 200, according to an embodiment. Optical signals are indicated by arrows. Electronic wired or wireless connections are indicated by segmented lines without arrowheads. A laser source 212 emits a beam (e.g., carrier wave) 201 that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 can be produced. A modulated or unmodulated reference beam 207a, which can have a much smaller amount of energy that is nonetheless enough to produce good mixing with the returned light 291 scattered from an object (not shown), can also be produced. As depicted in FIG. 2A, the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR within a spread of ranges of interest. In some embodiments, the reference beam 207b is called the local oscillator (LO) signal, such as if the reference beam 207b were produced locally from a separate oscillator. In various embodiments, from less to more flexible approaches, the reference can be caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, such as through some scanning optics 218. The detector array can be a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 can be combined in zero or more optical mixers 284 to produce an optical signal of characteristics to be properly detected. The frequency, phase or amplitude of the interference pattern, or some combination, can be recorded by acquisition system 240 for each detector at multiple times during the signal duration D. The number of temporal samples processed per signal duration or integration time can affect the down-range extent. The number or integration time can be a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned bits from the prior transmission history.

The acquired data is made available to a processing system 250, such as a computer system described below with reference to FIG. 7, or a chip set described below with reference to FIG. 8. A scanner control module 270 provides scanning signals to drive the scanning optics 218. The scanner control module 270 can include instructions to perform one or more steps of the method 500 related to the flowchart of FIG. 5 and/or the method 600 related to the flowchart of FIG. 6. A signed Doppler compensation module (not shown) in processing system 250 can determine the sign and size of the Doppler shift and the corrected range based thereon along with any other corrections. The processing system 250 also can include a modulation signal module (not shown) to send one or more electrical signals that drive modulators 282a, 282b and/or polygon scanners 244a, 244b and/or scanner 241. In some embodiments, the processing system also includes a vehicle control module 272 to control a vehicle on which the system 200, 200', 200" is installed.

Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to one embodiment. As depicted in FIG. 2A, the modulator 282a can be a frequency shifter added to the optical path of the transmitted beam 205. In some embodiments, the frequency shifter is added to the optical path of the returned beam 291 or to the reference path 220. The frequency shifter can be added as modulator 282b on the local oscillator (LO, also called the reference path) side or on the transmit side (before the optical amplifier) as the device used as the modulator (e.g., an acousto-optic modulator, AOM) has some loss associated and it can be disadvantageous to put lossy components on the receive side or after the optical amplifier. The optical shifter can shift the frequency of the transmitted signal (or return signal) relative to the frequency of the reference signal by a known amount $\Delta f_S$, so that the beat frequencies of the up and down chirps occur in different frequency bands, which can be picked up, e.g., by the FFT component in processing system 250, in the analysis of the electrical signal output by the optical detector 230. For example, if the blue shift causing range effects is $f_B$, then the beat frequency of the up chirp will be increased by the offset and occur at $f_B+\Delta f_S$ and the beat frequency of the down chirp will be decreased by the offset to $f_B-\Delta f_S$. Thus, the up chirps will be in a higher frequency band than the down chirps, thereby separating them. If $\Delta f_S$ is greater than any expected Doppler effect, there will be no ambiguity in the ranges associated with up chirps and down chirps. The measured beats can then be corrected with the correctly signed value of the known $\Delta f_S$ to get the proper up-chirp and down-chirp ranges. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Various such embodiments offer pathways that match the bands of the detected signals to available digitizer resources. In some embodiments, the modulator 282a is excluded (e.g. direct ranging).

Figure 2B:
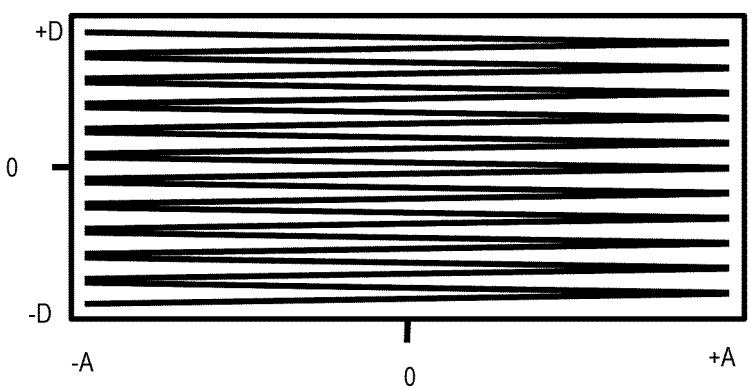
FIG. 2B is a block diagram that illustrates a saw tooth scan pattern for a hi-res Doppler system, used in some embodiments.
Figure 2C:
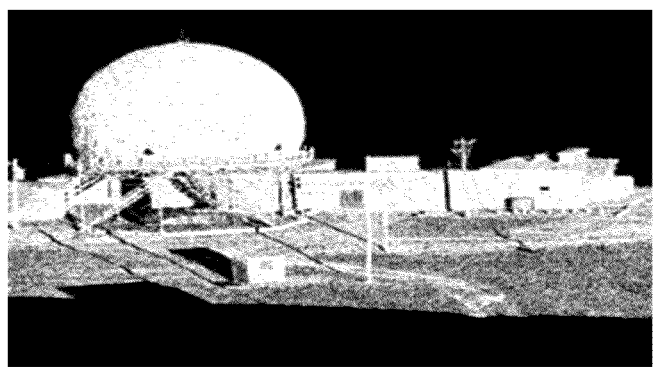
FIG. 2C is an image that illustrates an example speed point cloud produced by a hi-res Doppler LIDAR system, according to an embodiment.

FIG. 2B is a block diagram that illustrates a saw tooth scan pattern for a hi-res Doppler system. The scan sweeps through a range of azimuth angles (horizontally) and inclination angles (vertically above and below a level direction at zero inclination). Various scan patterns can be used, including adaptive scanning. FIG. 2C is an image that illustrates an example speed point cloud produced by a hi-res Doppler LIDAR system.

Figure 2D:
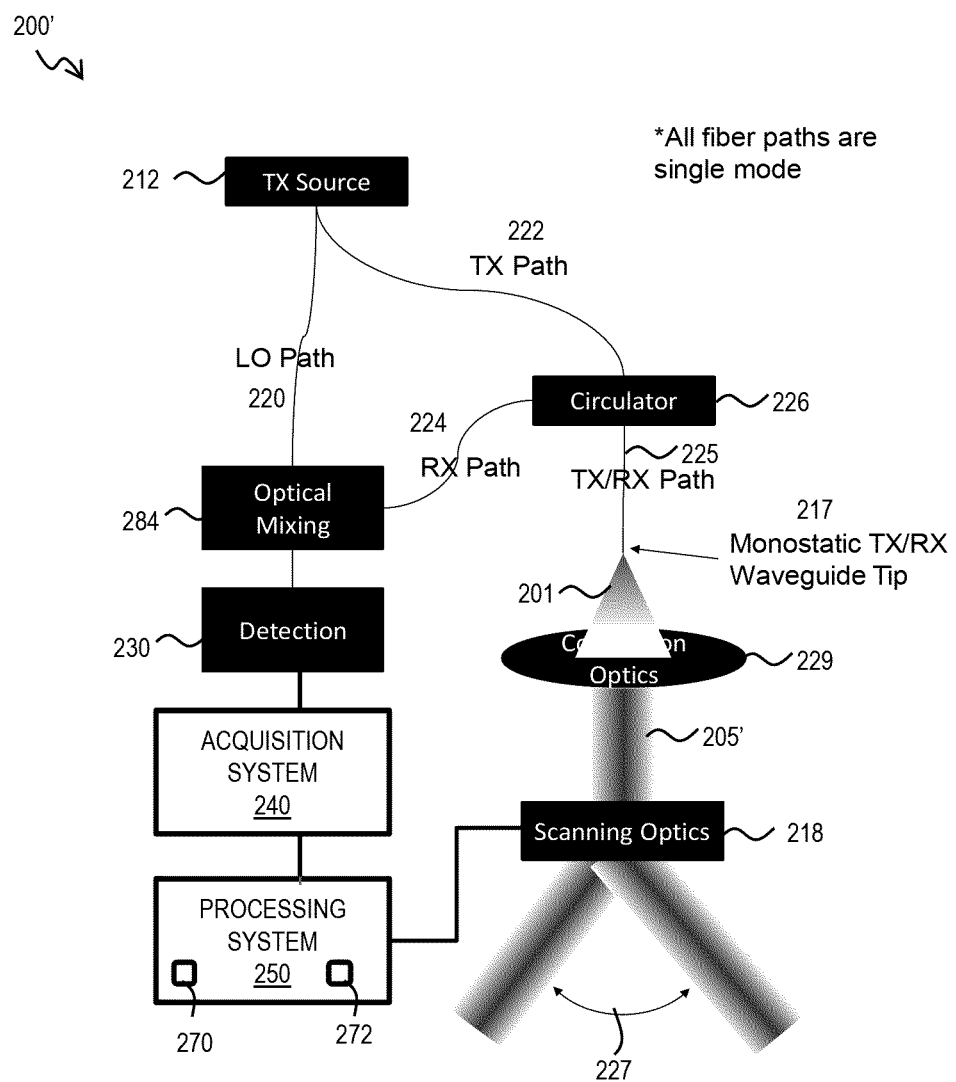
FIG. 2D is a block diagram that illustrates example components of a high resolution (hi res) LIDAR system, according to an embodiment.

FIG. 2D is a block diagram that illustrates example components of a high resolution (hi res) LIDAR system 200'. The system 200' can be similar to the system 200 with the exception of the features discussed herein. The system 200' can be a coherent LIDAR system that is constructed with monostatic transceivers. The system 200' can include the source 212 that transmits the carrier wave 201 along a single-mode optical waveguide 225 over a transmission path 222, through a circulator 226 and out a tip 217 of the single-mode optical waveguide 225 that is positioned in a focal plane of a collimating optic 229. The tip 217 can be positioned within a threshold distance (e.g. about 100 μm) of the focal plane of the collimating optic 229 or within a range from about 0.1% to about 0.5% of the focal length of the collimating optic 229. The collimating optic 229 can include one or more of doublets, aspheres or multi-element designs. The carrier wave 201 exiting the optical waveguide tip 217 can be shaped by the optic 229 into a collimated target beam 205' which is scanned over a range of angles 227 by scanning optics 218.

In some embodiments, the carrier wave 201 is phase or frequency modulated in a modulator 282a upstream of the collimation optic 229. In some embodiments, modulator 282 is excluded. Return beams 291 from an object can be directed by the scanning optics 218 and focused by the collimation optics 229 onto the tip 217 so that the return beam 291 is received in the single-mode optical waveguide tip 217. The return beam 291 can then redirected by the circulator 226 into a single mode optical waveguide along the receive path 224 and to optical mixers 284 where the return beam 291 is combined with the reference beam 207b that is directed through a single-mode optical waveguide along a local oscillator path 220. The system 200' can operate under the principal that maximum spatial mode overlap of the returned beam 291 with the reference signal 207b will maximize heterodyne mixing (optical interference) efficiency between the returned signal 291 and the reference beam 207b. This arrangement is advantageous as it can help to avoid challenging alignment procedures associated with bi-static LIDAR systems.

FIG. 2E is a block diagram that illustrates a side view of example components of a high resolution (hi res) LIDAR system 200". FIG. 2F is a block diagram that illustrates a top view of the example components of the high resolution (hi res) LIDAR system 200" of FIG. 2E. The system 200" can be similar to the system 200' with the exception of the features discussed herein. The scanning optics 218 of the system 200" includes a first polygon scanner 244a coupled to at least one motor (e.g., motor 257 shown in FIG. 2J) and configured to rotate at a first angular velocity 249a about a rotation axis 243. The scanning optics 218 can include a second polygon scanner 244b coupled to the at least one motor and configured to rotate at a second angular velocity 249b about the rotation axis 243. Although two polygon scanners 244a, 244b are depicted, more than two polygon scanners can be featured in the scanning optics 218. The at least one motor can include a first motor that rotates the first polygon scanner 244a and a second motor that rotates the second polygon scanner 244b. The first angular velocity 249a at which the first polygon scanner 244a rotates can be a first fixed rotation speed. The second angular velocity 249b at which the second polygon scanner 244b rotates can be a second fixed rotation speed. The second fixed rotation speed can be different (e.g. less than) the first fixed rotation speed. The first fixed rotation speed of the first angular velocity 249a can be in a range from about 1000 revolutions per minute (rpm) to about 5000 rpm and the second fixed rotation speed of the second angular velocity 249b is in a range from about 200 rpm to about 1000 rpm. The first polygon scanner 244a and second polygon scanner 244b can rotate in different directions, such as opposite directions (e.g., clockwise and counter-clockwise); for example, the first angular velocity 249a and the second angular velocity 249b can have different directions (e.g. clockwise and counter-clockwise). The scanners 244a, 244b may not be limited to the polygon scanners depicted in FIGS. 2E-2F and may include any type of polygon scanner (e.g. prismatic, pyramidal, stepped geometries, etc.).

In an example embodiment, each polygon scanner 244a, 244b has one or more of the following characteristics: manufactured by Blackmore® Sensors with Copal turned mirrors, has an inscribed diameter of about 2 inches or in a range from about 1 inch to about 3 inches, each mirror is about 0.5 inches tall or in a range from about 0.25 inches to about 0.75 inches, has an overall height of about 2.5 inches or in a range from about 2 inches to about 3 inches, is powered by a three-phase Brushless Direct Current (BLDC) motor with encoder pole-pair switching, has a rotation speed in a range from about 1000 revolutions per minute (rpm) to about 5000 rpm, has a reduction ratio of about 5:1 and a distance from the collimator 229 of about 1.5 inches or in a range from about 1 inch to about 2 inches. In some embodiments, the scanning optics 218 of the system 200" use an optic other than the polygon scanners 244a, 244b.

In some embodiments, one or more parameters of the polygon scanners 244a, 244b are different from one another. A mass of the second polygon scanner 244b can be greater than a mass of the first polygon scanner 244a. The outer diameter of the polygon scanners 244a, 244b can be about equal but the first polygon scanner 244a can have a larger bore (e.g. larger inner diameter) through which the rotation axis 243 is received, so that the mass of the first polygon scanner 244a is less than the second polygon scanner 244b. A ratio of the mass of the second polygon scanner 244b to the mass of the first polygon scanner 244a can be about equal to the ratio of the rotation speed of the first angular velocity 249a to the rotation speed of the second angular velocity 249b. This advantageously ensures there is no net angular momentum between the polygon scanners 244a, 244b during rotation due to inertial changes, which can facilitate stability of the system 200" during operation. The angular momentum and the moment of inertia of each polygon scanner 244a, 244b is provided by:

$$\vec{L} = I\vec{\omega} \quad (5a)$$

$$I = mr^2 \quad (5b)$$

where L is the angular momentum of each polygon scanner 244a, 244b; I is the moment of inertia of each polygon scanner 244a, 244b; ω is the angular velocity 249a, 249b; m is the mass of each polygon scanner 244a, 244b and r is the radial distance of the mass m from the rotation axis 243. In an embodiment, the first rotation speed of the first angular velocity 249a is greater than the second rotation speed of the second angular velocity 249b and a ratio of the first rotation speed to the second rotation speed is in a range from about 3 to about 10. In this embodiment, the mass of the second polygon scanner 244b is greater than the mass of the first polygon scanner 244a based on the same ratio of the first rotation speed to the second rotation speed. Thus, although the moment of inertia I of the second polygon scanner 244b is greater than that of the first polygon scanner 244a, per equation 5b, the magnitude of the angular velocity (e.g. rotation speed) of the first polygon scanner 244a is greater than the second polygon scanner 244b by an equal magnitude and thus, the angular momentum L of the polygon scanners 244a, 244b is about equal in magnitude, per equation 5a and opposite in sign since the angular velocities 249a, 249b are opposite in direction. This advantageously ensures that there is no or negligible net angular momentum between the polygon scanners 244a, 244b during operation of the system 200".

The system 200" can include a scanner 241 positioned between the collimator 229 and the scanning optics 218 (e.g. polygon scanners 244a, 244b) that is configured to adjust a direction of the collimated beam 205' in a third plane 234 (e.g. plane of FIG. 2E). The scanner 241 can adjust the direction of the collimated beam 205' between the first polygon scanner 244a and the second polygon scanner 244b. The scanner 241 can adjust the beam 205' as a scanned beam 233 between a facet 245a, 245b of the first polygon scanner 244a and a facet 245a, 245b of the second polygon scanner 244b. The scanner 241 can continuously move the scanned beam 233 between the facets 245 of the first polygon scanner 244a and the facets 245 of the second polygon scanner 244b using a triangular waveform (e.g. five times per second).

When the scanner 241 directs the scanned beam 233 onto a facet 245a, 245b of the first polygon scanner 244a, the facet 245a, 245b can deflect the beam 233' into a first plane 235 (e.g. plane of FIG. 2F) that is different from the third plane 234 (e.g. plane of FIG. 2E) in which the beam 233 is incident on the first polygon scanner 244a. FIG. 2J depicts the first plane 235 that defines a lower scan region 264 where the beam 233' is scanned from the first angle to the second angle. In an embodiment, the first plane 235 forms an angle of about 85 degrees or 105 degrees with the rotation axis 243 or an angle in a range from about 45 degrees to about 150 degrees or in a range from about 30 degrees to about 150 degrees. In an embodiment, the second plane 237 forms an angle of about 90 degrees with the rotation axis 243 or an angle in a range from about 60 degrees to about 120 degrees or in a range from about 40 degrees to about 150 degrees. In an embodiment, based on the rotation of the first polygon scanner 244a about the rotation axis 243, the scanned beam 233' is deflected by the facet 245a, 245b of the first polygon scanner 244a from a first angle to a second angle within the first plane 235 (e.g. plane of FIG. 2F). The first plane 235 (e.g. plane of FIG. 2F) can be about orthogonal to the third plane 234. For purposes of this description, orthogonal means a relative orientation defined by angle in a range of 90±20 degrees. The scanner 241 can adjust the direction of the scanned beam 233 at a fixed scan speed sufficiently slow that the scanned beam 233' is deflected from the first angle to the second angle within the first plane 235 a threshold number (e.g. one) of times during the time period that the scanned beam 233 is directed on the first polygon scanner 244a. The scanner 241 can adjust the direction of the scanned beam 233 at a scan speed to the facet 245a, 245b of the first polygon scanner 244a and hold the position of the scanned beam 233 for a minimum time period so that the scanned beam 233' is deflected from the first angle to the second angle within the first plane 235 a threshold number (e.g. one) of times.

In an embodiment, when the scanner 241 directs the scanned beam 233 from the first polygon scanner 244a onto a facet 245a, 245b of the second polygon scanner 244b, the facet 245a, 245b deflects the beam 233' into a second plane 237 that is different from the third plane 234 (e.g. plane of FIG. 2E) in which the beam 233 is incident on the second polygon scanner 244b and is different from the first plane 235. FIG. 2J depicts the second plane 237 that defines an upper scan region 262 of a scan region 261 (see FIG. 2K) where the beam 233' is scanned from the first angle to the second angle. In some embodiments, the upper scan region 262 and lower scan region 264 of the scan region 261 have an overlapping region 263. In some embodiments, the upper scan region 262 and lower scan region 264 do not overlap and thus there is no overlapping region 263. In an embodiment, the second plane 237 forms an angle of about 90 degrees with the rotation axis 243. In an embodiment, based on the rotation of the second polygon scanner 244b about the rotation axis 243, the scanned beam 233' is deflected by the facet 245a, 245b of the second polygon scanner 244b from a first angle to a second angle within the second plane 237 (e.g. plane of FIG. 2F). A direction of the second angular velocity 249b can be opposite to the direction of first angular velocity 249a and thus the beam 233' is counter scanned in the second plane 237 in an opposite direction (e.g. from the second angle to the first angle) as compared to the beam 233' scanned in the first plane 235 (e.g. from the first angle to the second angle). The second plane 237 (e.g. plane of FIG. 2F) can be about orthogonal to the third plane 234. The scanner 241 can adjust the direction of the scanned beam 233 at a fixed scan speed sufficiently slow that the scanned beam 233' is deflected from the first angle to the second angle within the second plane 237 a threshold number (e.g. one) of times during the time period that the scanned beam 233 is directed on the second polygon scanner 244b. The scanner 241 can adjust the direction of the scanned beam 233 at a scan speed to the facet 245a, 245b of the second polygon scanner 244b and hold the position of the scanned beam 233 for a minimum time period so that the scanned beam 233' is deflected from the first angle to the second angle within the second plane 237 a threshold number (e.g. one) of times.

Figure 2I:
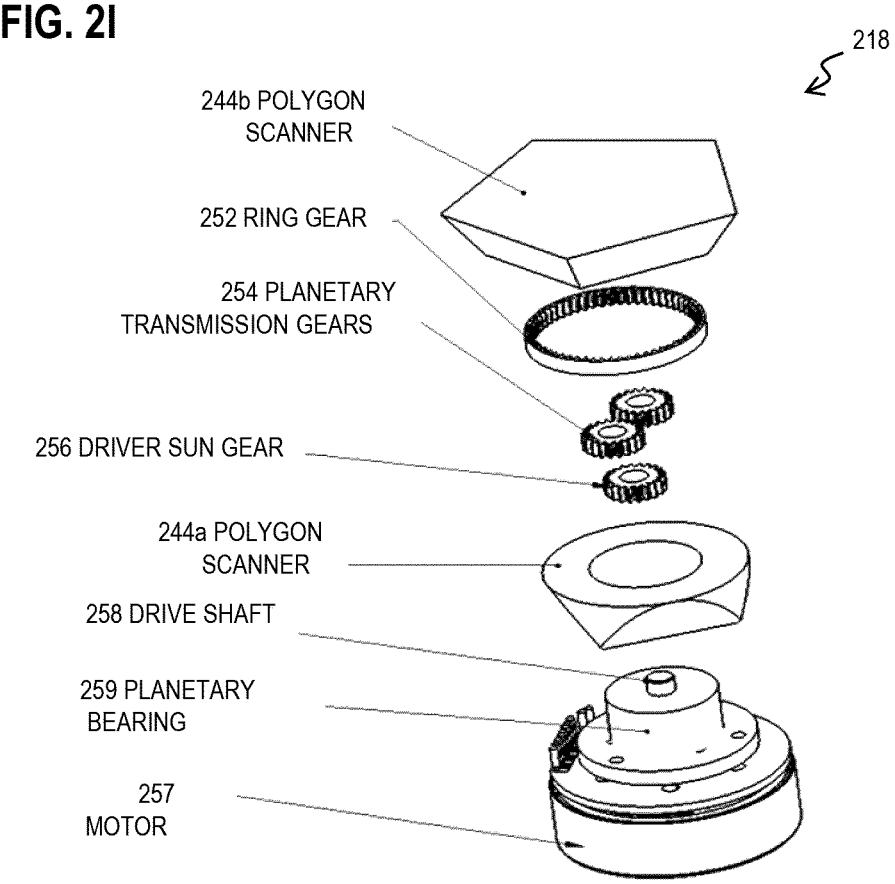
FIG. 2I is a schematic diagram that illustrates an exploded view of the scanning optics of the system of FIG. 2E, according to an embodiment.

FIG. 2I is a schematic diagram that illustrates an exploded view of an example of the scanning optics 218 of the system 200" of FIG. 2E. In an embodiment, the scanning optics 218 includes the first polygon scanner 244a, which can be coupled to the motor 257, and the second polygon scanner 244b, which can be coupled to the motor 257 through the first polygon scanner 244a. The first polygon scanner 244a can be rotatably mounted to a drive shaft 258 and a planetary bearing 259 of the motor 257. The first polygon scanner 244a can include a recess (not shown) to receive the drive shaft 258 and planetary bearing 259. The second polygon scanner 244b can be rotatably mounted to the first polygon scanner 244a with planetary transmission gears 254 and a driver sun gear 256 that are positioned within a ring gear 252. The ring gear 252 can be received within a cavity (not shown) on an undersurface of the second polygon scanner 244b. One or more parameters of the gears 254, 256 and/or ring gear 252 (e.g. diameter, quantity, etc.) can be selected to adjust a ratio of a magnitude of the rotation speed of the first angular velocity 249a of the first polygon scanner 244a to a magnitude of the rotation speed of the second angular velocity 249b of the second polygon scanner 244b. For example, the ratio can be in a range from about 3 to about 10 or in a range from about 2 to about 20. The motor 257 can be manufactured by Nidec Copal® Electronics, Inc. of Torrance, Calif. The transmission (e.g. gears 254, 256 and ring 252) can be provided by SDP/SI® gears including S1EO5ZM05S072 internal ring gear coupled with selections from ground metric spur gear offerings.

Although the motor 257 in FIG. 2I causes both of the polygon scanners 244a, 244b to move at the same time (e.g. in opposite directions), as depicted in FIGS. 2E-2F the beam 233 may be only directed by the scanner 241 onto one polygon scanner 244a, 244b at a time, so that the beam 233' is scanned through the first plane 235 over the lower scan region 264 over a first time period and is subsequently scanned through the second plane 237 over the upper scan region 262 over a second time period after the first time period.

FIG. 2G is a block diagram that illustrates a side view of example components of a high resolution (hi res) LIDAR system 200", according to an embodiment. FIG. 2H is a block diagram that illustrates a top view of the example components of the high resolution (hi res) LIDAR system 200" of FIG. 2G, according to an embodiment. The system 200" of FIGS. 2G-2H can be similar to that described with reference to FIGS. 2E-2F, with the exception of the features discussed herein. Unlike the embodiment of FIGS. 2E-2F where a single waveguide 225 and a single collimator 229 provide a single collimated beam 205' that is scanned by the scanner 241 between the first polygon scanners 244a to the second polygon scanner 244b, the system 200" of FIGS. 2G-2H includes a pair of waveguides 225a, 225b and a pair of collimators 229a, 229b that respectively provide a pair of collimated beams 205' to the first and second polygon scanners 244a, 244b. In an embodiment, the system 200" of FIGS. 2G-2H excludes the scanner 241. The beam 201 from the laser source 212 may be split by a beam splitter (not shown) into two beams 201 that are directed into the waveguides 225a, 225b. The system 200" can include two circulators 226 and two receiving waveguides in the receive path 224 to accommodate separate return beams 291 from the respective polygon scanners 244a, 244b that are received at the tips of the respective waveguides 225a, 225b. The system 200" of FIGS. 2G-2H can include two laser sources 212 and each waveguide 225a, 225b can receive a respective beam 201 from one of the laser sources 212. The system 200" can also include two circulators 226 and two receiving waveguides to process separate return beams 291 from the polygon scanners 244a, 244b. The system 200" of FIGS. 2G-2H can accommodate simultaneous scanning of the beam 233' in the first and second plane 235, 237 and thus in the upper scan region and lower scan region 262, 264 (e.g. in opposite directions) since the system 200" includes two processing channels to accommodate simultaneous return beams 291 from the polygon scanners 244a, 244b.

4. Monostatic Coherent LIDAR System Parameters

In an embodiment, monostatic coherent LIDAR performance of the system 200', 200" is modeled by including system parameters in a so called "link budget". A link budget estimates the expected value of the signal to noise ratio (SNR) for various system and target parameters. On the system side, a link budget can include one or more of output optical power, integration time, detector characteristics, insertion losses in waveguide connections, mode overlap between the imaged spot and the monostatic collection waveguide, and optical transceiver characteristics. On the target side, a link budget can include one or more of atmospheric characteristics, target reflectivity, and target range.

Figure 4A:
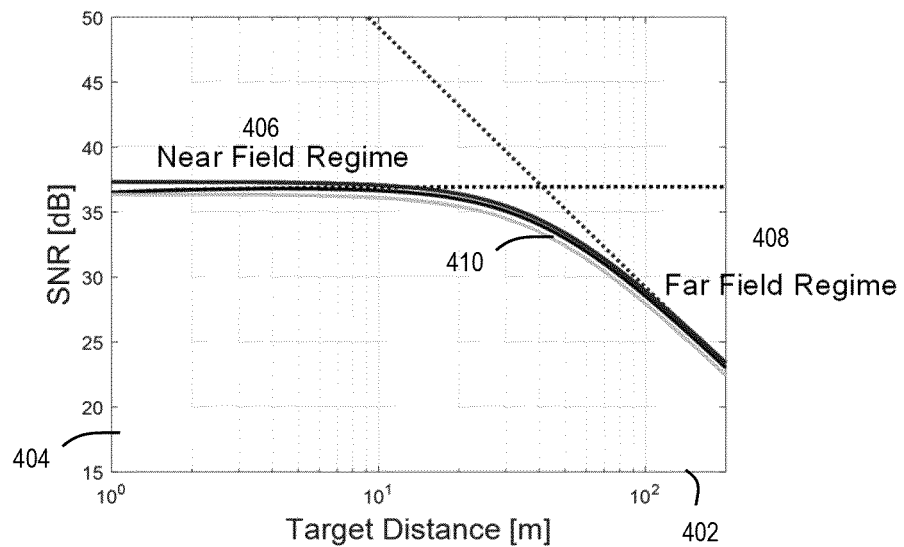
FIG. 4A is a graph that illustrates an example signal-to-noise ratio (SNR) versus target range for the transmitted signal in the system of FIG. 2D without scanning, according to an embodiment.
Figure 4B:
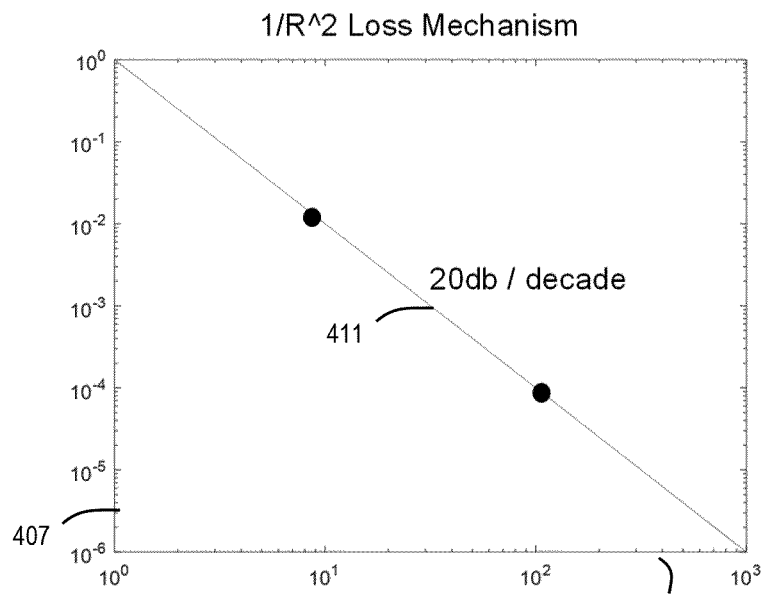
FIG. 4B is a graph that illustrates an example of a curve indicating a 1/r-squared loss that drives the shape of the SNR curve of FIG. 4A in the far field, according to an embodiment.

FIG. 4A is a graph that illustrates an example signal-to-noise ratio (SNR) versus target range for the return beam 291 in the system 200' of FIG. 2D or systems 200" of FIGS. 2E-2H without scanning, according to an embodiment. In other embodiments, FIG. 4A depicts an example of SNR versus target range for the return beam 291 in the system 200 of FIG. 2A. The horizontal axis 402 is target range in units of meters (m). The vertical axis 404 is SNR in units of decibels (dB). A curve 410 depicts the values of SNR versus range that is divided into a near field 406 and a far field 408 with a transition from the near field 406 of the curve 410 with a relatively flat slope to the far field 408 of the curve 410 with a negative slope (e.g. about −20 dB per 10 m). The reduction in SNR in the far field 408 is dominated by "r-squared" losses, since the scattering atmosphere through which the return beam 291 passes grows with the square of the range to the target while the surface area of the optical waveguide tip 217 to collect the return beam 291 is fixed. FIG. 4B is a graph that illustrates an example of a curve 411 indicating 1/r-squared loss that drives the shape of the SNR curve 410 in the far field 408, according to an embodiment. The horizontal axis 402 is range in units of meters (m) and the vertical axis 407 is power loss that is unitless.

Figure 4C:
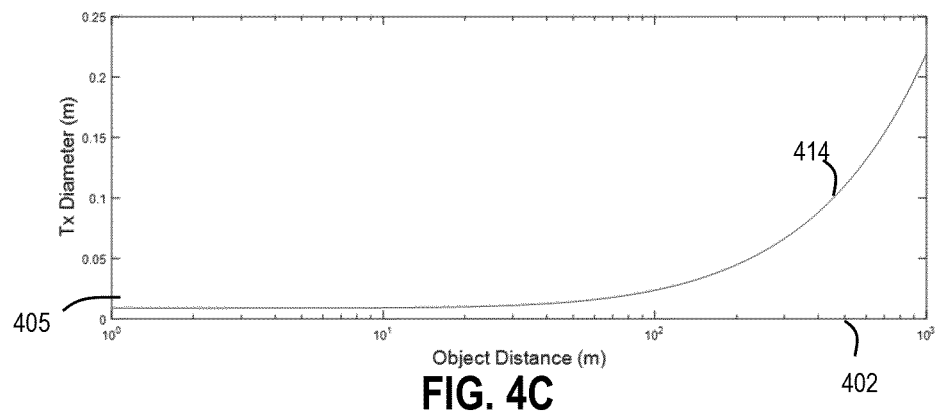
FIG. 4C is a graph that illustrates an example of collimated beam diameter versus range for the transmitted signal in the system of FIG. 2D without scanning, according to an embodiment.

In the near field 406, a primary driver of the SNR is a diameter of the collimated return beam 291 before it is focused by the collimation optics 229 to the tip 217. FIG. 4C is a graph that illustrates an example of collimated beam diameter versus range for the return beam 291 in the system 200' of FIG. 2D or system 200" of FIGS. 2E-2H without scanning, according to an embodiment. The horizontal axis 402 is target range in units of meters (m) and the vertical axis 405 is diameter of the return beam 291 in units of meters (m). In an embodiment, curve 414 depicts the diameter of the collimated return beam 291 incident on the collimation optics 229 prior to the return beam 291 being focused to the tip 217 of the optical waveguide. The curve 414 illustrates that the diameter of the collimated return beam 291 incident on the collimation optics 229 increases with increasing target range.

Figure 4D:
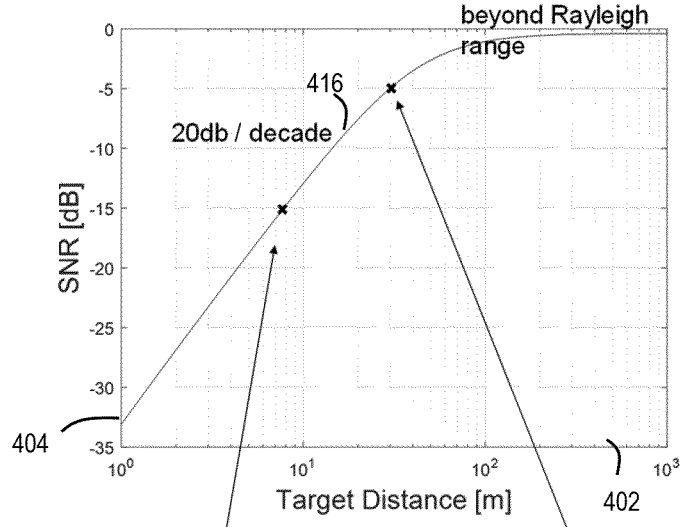
FIG. 4D is a graph that illustrates an example of SNR associated with collection efficiency versus range for the transmitted signal in the system of FIG. 2D without scanning, according to an embodiment.
Figure 4D:
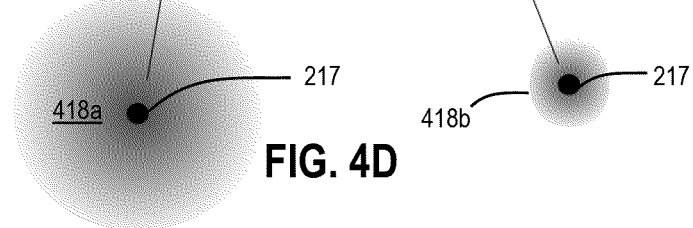

In an embodiment, in the near field 406, as the diameter of the collimated return beam 291 grows at larger target ranges, a diameter of the focused return beam 291 by the collimation optics 229 at the tip 217 shrinks. FIG. 4D is a graph that illustrates an example of SNR associated with collection efficiency of the return beam 291 at the tip 217 versus range for the transmitted signal in the system of FIG. 2D or FIGS. 2E-2H without scanning, according to an embodiment. The horizontal axis 402 is target range in units of meters (m) and the vertical axis 404 is SNR in units of decibels (dB). The curve 416 depicts the near field SNR of the focused return beam 291 by the collimation optics 229 at the tip 217 based on target range. At close ranges within the near field 406, an image 418a of the focused return beam 291 at the tip 217 by the collimation optics 229 is sufficiently larger than the core size of the single mode optical fiber tip 217. Thus the SNR associated with the collection efficiency is relatively low. At longer ranges within the near field 406, an image 418b of the focused return beam 291 at the tip 217 by the collimation optics 229 is much smaller than the image 418a and thus the SNR attributable to the collection efficiency increases at longer ranges. In an embodiment, the curve 416 demonstrates that the SNR in near field 406 has a positive slope (e.g. +20 dB per 10 meters) based on the improved collection efficiency of the focused return beam 291 at longer ranges. In one embodiment, this positive slope in the near field SNR cancels the negative slope in the near field SNR discussed in FIG. 4B that is attributable to "r-squared" losses and thus leads to the relatively flat region of the SNR curve 410 in the near field 406. The positive slope in the SNR curve 416 in FIG. 4D does not extend into the far field 408 and thus the "r-squared" losses of FIG. 4B dominate the far field 408 SNR as depicted in the SNR curve 410 in the far field 408.

Figure 4E:
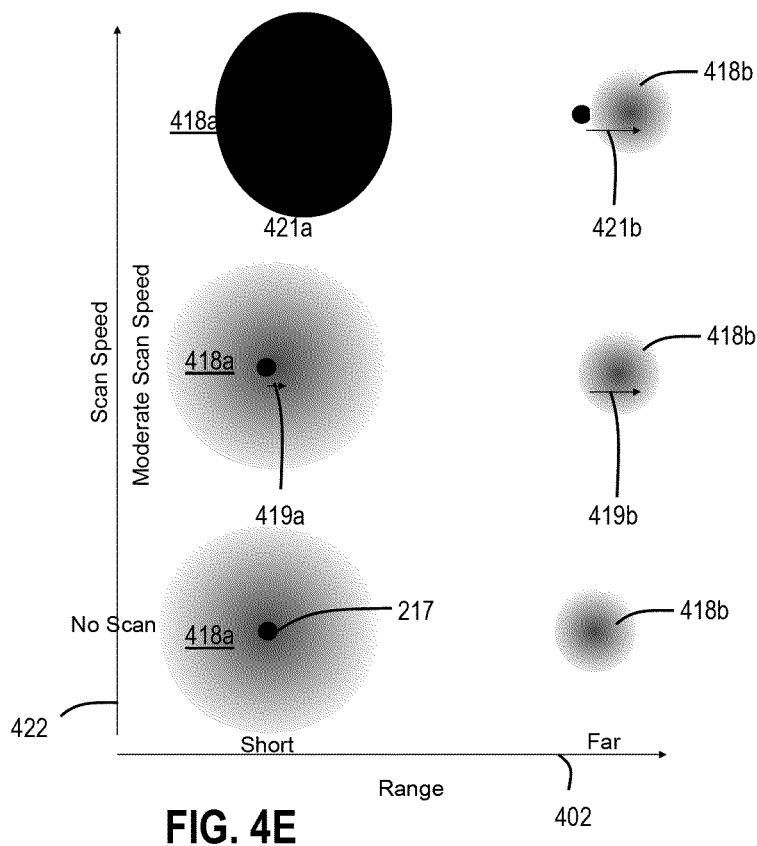
FIG. 4E is an image that illustrates an example of beam walkoff for various target ranges and scan speeds in the system of FIG. 2D, according to an embodiment.

While the discussion in relation to FIGS. 4A-4D predicts SNR of the return beam 291 as a function of the target range, the predicted SNR in FIGS. 4A-4D does not fully characterize the performance of the scanned monostatic coherent LIDAR system 200', 200" since it does not consider a scan rate of the scanning optics 218. In an embodiment, due to round trip delay of the return beam 291, the receive mode of the return beam 291 will laterally shift or "walk off" from the transmitted mode of the transmitted beam 205' when the beam is being scanned by the scanning optics 218. FIG. 4E illustrates an example of beam walkoff for various target ranges and scan speeds in the system 200' of FIG. 2D or system 200" of FIGS. 2E-2H (e.g. fixed scan speeds of polygon scanners 244a, 244b), according to an embodiment. The horizontal axis 402 is target range and the vertical axis 422 is scan speed of the beam using the scanning optics 218. As FIG. 4E depicts, there is no beam walkoff when the beam is not scanned (bottom row) since the image 418a of the focused return beam 291 is centered on the fiber tip 217 demonstrating no beam walkoff at short target range and the image 418b of the focused return beam 291 is also centered on the fiber tip 217 demonstrating no beam walkoff at far target range. When the beam is scanned at a moderate scan speed (middle row in FIG. 4E), a moderate beam walkoff 419a is observed between the image 418a of the focused return beam 291 and the fiber tip 217 and a larger beam walkoff 419b is observed between the image 418b of the focused return beam 291 and the fiber tip 217. When the beam is scanned at a high scan speed (top row in FIG. 4E), a beam walkoff 421a is observed at short range that exceeds the beam walkoff 419a at the moderate scan speed and a beam walkoff 421b is observed at large range that exceeds the beam walk off 419b at the moderate scan speed. Thus, the beam walkoff increases as the target range and scan speed increase. In an embodiment, increased target range induces a time delay during which the image 418a, 418b shifts away from the tip 217 of the fiber core. Thus a model of the mode overlap accounts this walkoff appropriately. In one embodiment, such a model should limit the beam walkoff 419 based on a diameter of the image 418 (e.g. no greater than half of the diameter of the image 418).

Figure 4F:
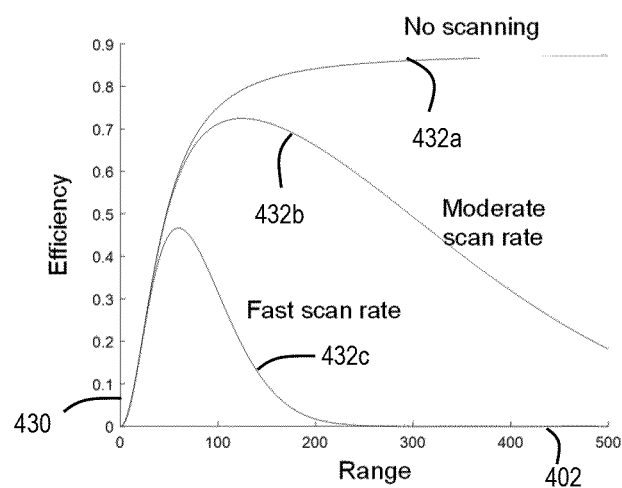
FIG. 4F is a graph that illustrates an example of coupling efficiency versus target range for various scan rates in the system of FIG. 2D, according to an embodiment.

FIG. 4F is a graph that illustrates an example of coupling efficiency versus target range for various scan rates in the system 200' of FIG. 2D or system 200" of FIGS. 2E-2H, according to an embodiment. The horizontal axis 402 is target range in units of meters (m) and the vertical axis 430 is coupling efficiency which is unitless. In an embodiment, the coupling efficiency is inversely proportional to the beam walkoff 419. A first curve 432a depicts the coupling efficiency of the focused return beam 291 into the fiber tip 217 for various target ranges based on no scanning of the beam. The coupling efficiency remains relatively high and constant for a wide range of target ranges. A second curve 432b depicts the coupling efficiency of the focused return beam 291 into the fiber tip 217 for various target ranges based on moderate scan rate of the beam. In an embodiment, the coupling efficiency at the moderate scan rate peaks at a moderate target range (e.g. about 120 m) and then decreases as target range increases. A third curve 432c depicts the coupling efficiency of the focused return beam 291 into the fiber tip 217 for various target ranges based on a high scan rate of the beam. In an embodiment, the coupling efficiency of the high scan rate peaks at a low target range (e.g. about 80 m) and then decreases as target range increases.

Figure 4G:
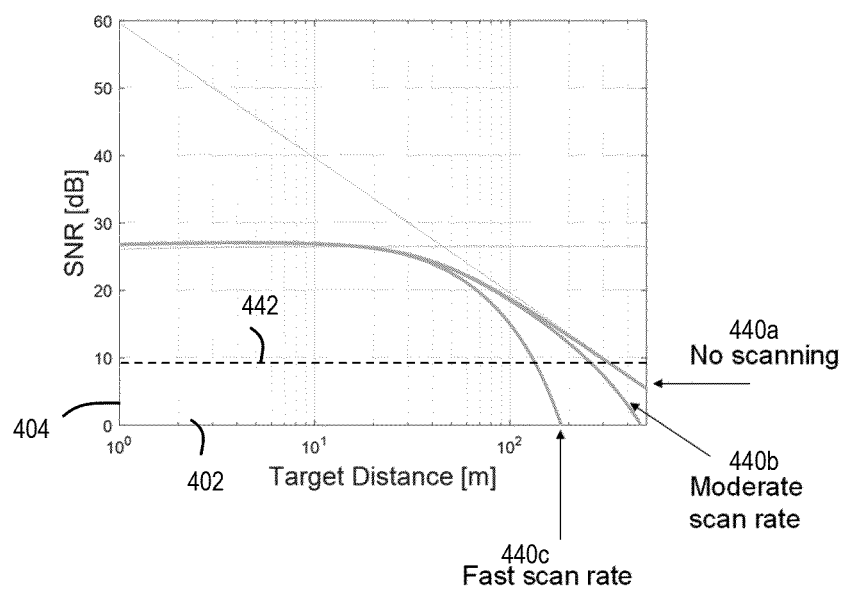
FIG. 4G is a graph that illustrates an example of SNR versus target range for various scan rates in the system of FIG. 2D, according to an embodiment.

Based on the curves in FIG. 4F, scanning too fast can eventually make it impossible to see beyond some target range. In this instance, the image 418b of the focused return beam 291 does not couple into the fiber tip 217 and instead has totally walked off the receiver mode of the tip 217. FIG. 4G is a graph that illustrates an example of SNR versus target range for various scan rates in the system 200' of FIG. 2D or system 200" of FIGS. 2E-2H, according to an embodiment. The horizontal axis 402 is target range in units of meters (m) and the vertical axis 404 is SNR in units of decibels (dB). A first curve 440a depicts the SNR of the focused return beam 291 on the fiber tip 217 based on target range where the beam is not scanned. A second curve 440b depicts the SNR of the focused return beam 291 on the fiber tip 217 based on target range where the beam is scanned at a moderate scan rate. In an example embodiment, the moderate scan rate is about 2500 degrees per sec (deg/sec) or in a range from about 1000 deg/sec to about 4000 deg/sec or in a range from about 500 deg/sec to about 5000 deg/sec. A third curve 440c depicts the SNR of the focused return beam 291 on the fiber tip 217 based on target range where the beam is scanned at a high scan rate. In an example embodiment, the high scan rate is about 5500 deg/sec or in a range from about 4000 deg/sec to about 7000 deg/sec or in a range from about 3000 deg/sec to about 8000 deg/sec. In an embodiment, the moderate scan rate and high scan rate are based on a beam size and goal of the system. In an embodiment, the moderate scan rate and high scan rate are based on the gearing structure of the scanning optics 218 in FIG. 2I, e.g. the polygon scanner 244a rotates at the high scan rate and the polygon scanner 244b rotates at the moderate scan rate where the ratio of the high scan rate to the moderate scan rate is based on the structure of the gears in FIG. 2I. In an example embodiment, the numerical ranges of the moderate scan rate and high scan rate above are based on a collimated beam with a diameter of about 1 centimeter (cm) used to scan an image out to a maximum target range of about 200 meters (m).

In addition to the scan rate of the beam, the SNR of the return beam 291 is affected by the integration time over which the acquisition system 240 and/or processing system 250 samples and processes the return beam 291. In some embodiments, the beam is scanned between discrete angles and is held stationary or almost stationary at discrete angles in the angle range 227 for a respective integration time at each discrete angle. The SNR of the return beam 291 is affected by the value of the integration time and the target range. As previously discussed, the cross sectional area of the beam increases with target range resulting in increased atmospheric scattering and thus an intensity of the return beam 291 decreases with increasing range. Accordingly, a longer integration time is needed to achieve the same SNR for a return beam 291 from a longer target range.

Figure 4H:
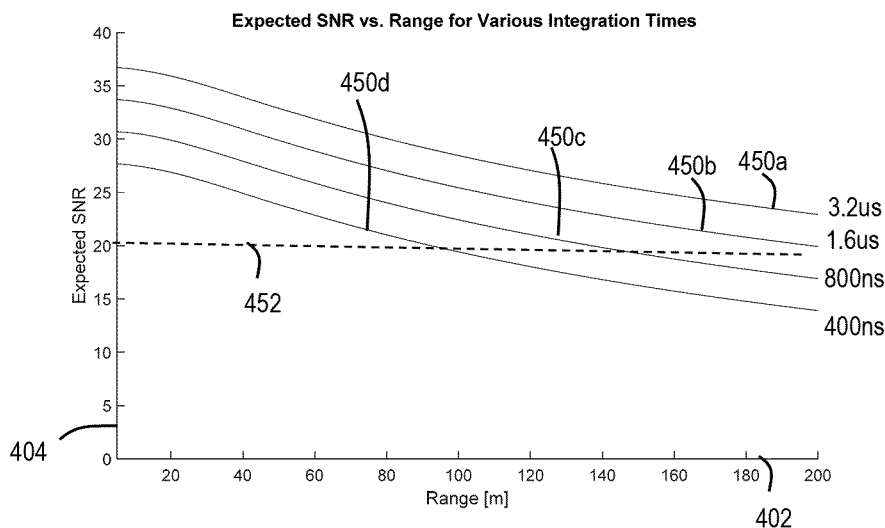
FIG. 4H is a graph that illustrates an example of SNR versus target range for various integration times in the system of FIG. 2D, according to an embodiment.
Figure 4I:
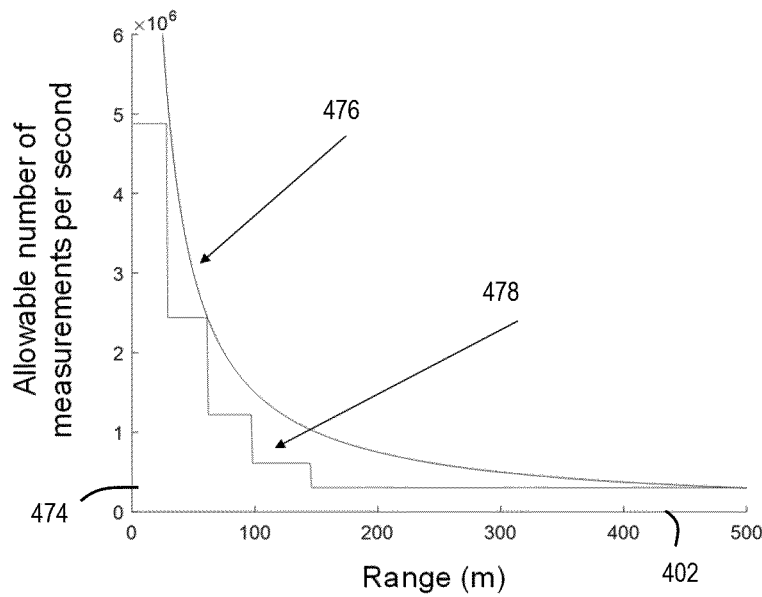
FIG. 4I is a graph that illustrates an example of a measurement rate versus target range in the system of FIG. 2D, according to an embodiment.

FIG. 4H is a graph that illustrates an example of SNR versus target range for various integration times in the system 200' of FIG. 2D or system 200" of FIGS. 2E-2H, according to an embodiment. The horizontal axis 402 is target range in units of meters (m) and the vertical axis 404 is SNR in units of decibels (dB). A first curve 450a depicts SNR values of the return beam 291 over the target range, where the system 200', 200" is set to a first integration time (e.g. 3.2 μs). A second curve 450b depicts SNR values of the return beam 291 over the target range, where the system 200', 200" is set to a second integration time (e.g. 1.6 μs). A third curve 450c depicts SNR values of the return beam 291 over the target range, where the system 200', 200" is set to a third integration time (e.g. 800 ns). A fourth curve 450d depicts SNR values of the return beam 291 over the target range, where the system 200', 200" is set to a fourth integration time (e.g. 400 ns). The curves 450 demonstrate that for a fixed target range, an increased SNR is achieved with increasing integration time. The curves 450 also demonstrate that for a fixed integration time, the SNR of the return beam 291 decreases with increased range for the reasons previously discussed. In an embodiment, the LIDAR system 200" selects a fixed integration time (e.g. 1.6 μs) for the scanning at the range of angles 227 and resulting target ranges, so that the SNR associated with the fixed integration time exceeds an SNR threshold 452 over the target range. In some embodiments, the system 200" minimizes the integration time at each angle within the range of angles 227 using the target range at each angle, so to minimize the integration time over the range of angles 227. FIG. 4I is a graph that illustrates an example of a measurement rate versus target range in the system 200' of FIG. 2D or system 200" of FIGS. 2E-2H, according to an embodiment. The horizontal axis 402 is target range in units of meters (m) and the vertical axis 474 is number of allowable measurements per unit time in units of number of allowable measurements per second. Curve 476 depicts the number of allowable measurements per second at each target range. In an embodiment, curve 476 represents an inverse of the integration time, e.g. the number of return beams 291 that can be detected at each target range per second whereas integration time conveys how long it takes to process the return beam 291 at each target range. Curve 478 is also provided and is a good target of the number of allowable measurements per second at each target range. The curve 478 is based on power of 2 intervals for a given ADC (analog to digital conversion) rate. Curve 478 represents a good target of the number of allowable measurements per second since when the number of digitized samples is a power of 2, the fast fourier transform on such a length signal is more efficient.

5. Vehicle Control Overview

In some embodiments a vehicle is controlled at least in part based on data received from a hi-res Doppler LIDAR system mounted on the vehicle.

Figure 3A:
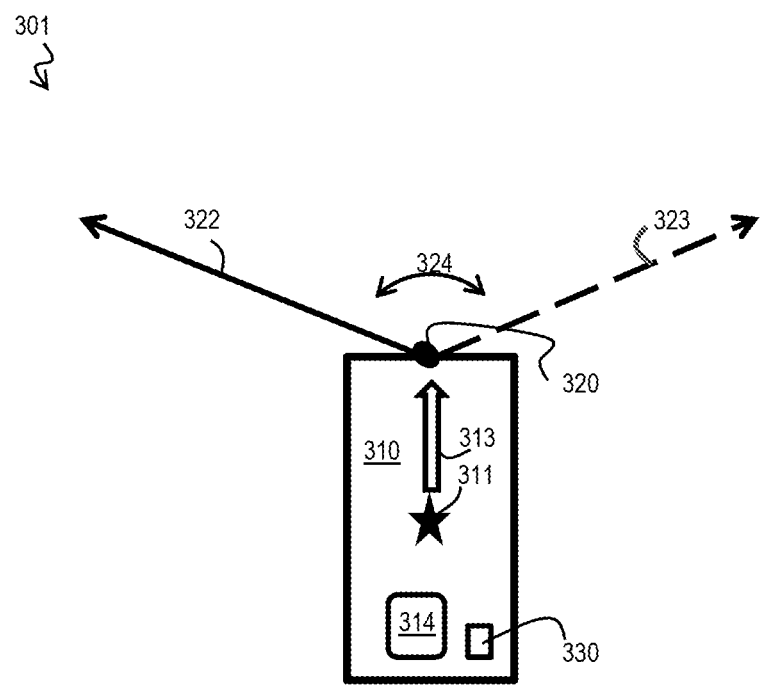
FIG. 3A is a block diagram that illustrates an example system that includes at least one hi-res LIDAR system mounted on a vehicle, according to an embodiment.

FIG. 3A is a block diagram that illustrates an example system 301 that includes at least one hi-res Doppler LIDAR system 320 mounted on a vehicle 310, according to an embodiment. The LIDAR system 320 can incorporate features of the LIDAR systems 200, 200', 200". The vehicle has a center of mass indicted by a star 311 and travels in a forward direction given by arrow 313. In some embodiments, the vehicle 310 includes a component, such as a steering or braking system (not shown), operated in response to a signal from a processor, such as the vehicle control module 272 of the processing system 250. In some embodiments the vehicle has an on-board processor 314, such as chip set depicted in FIG. 8. In some embodiments, the on board processor 314 is in wired or wireless communication with a remote processor, as depicted in FIG. 7. In an embodiment, the processing system 250 of the LIDAR system is communicatively coupled with the on-board processor 314 or the processing system 250 of the LIDAR is used to perform the operations of the on board processor 314 so that the vehicle control module 272 causes the processing system 250 to transmit one or more signals to the steering or braking system of the vehicle to control the direction and speed of the vehicle. The hi-res Doppler LIDAR uses a scanning beam 322 that sweeps from one side to another side, represented by future beam 323, through an azimuthal field of view 324, as well as through vertical angles (FIG. 3B) illuminating spots in the surroundings of vehicle 310. In some embodiments, the field of view is 360 degrees of azimuth. In some embodiments the inclination angle field of view is from about +10 degrees to about −10 degrees or a subset thereof. In an embodiment, the field of view 324 includes the upper scan region 262 and lower scan region 264. In this embodiment, the scanning beam 322 is scanned in a similar manner as the beam 233' in the system 200" of FIGS. 2E-2F or FIGS. 2G-2H, e.g. the scanning beam 322 is scanned over the field of view 324 in the upper scan region 262 by the second polygon scanner 244b and the scanning beam 322 is also scanned over the field of view 324 in the lower scan region 264 by the first polygon scanner 244a. In one example embodiment, such as the system 200" of FIGS. 2E-2F, the scanning beam 322 is scanned over the upper scan region 262 and lower scan region 264 at separate time periods. In another example embodiment, as such as the system of FIGS. 2G-2H, the scanning beam 322 is simultaneously scanned over the upper scan region 262 and lower scan region 264. In another example embodiment, the scanning beam 322 is scanned in opposite directions (counter scan) over the upper scan region 262 and lower scan region 264.

In some embodiments, the vehicle includes ancillary sensors (not shown), such as a GPS sensor, odometer, tachometer, temperature sensor, vacuum sensor, electrical voltage or current sensors. In some embodiments, a gyroscope 330 is included to provide rotation information.

Figure 3B:
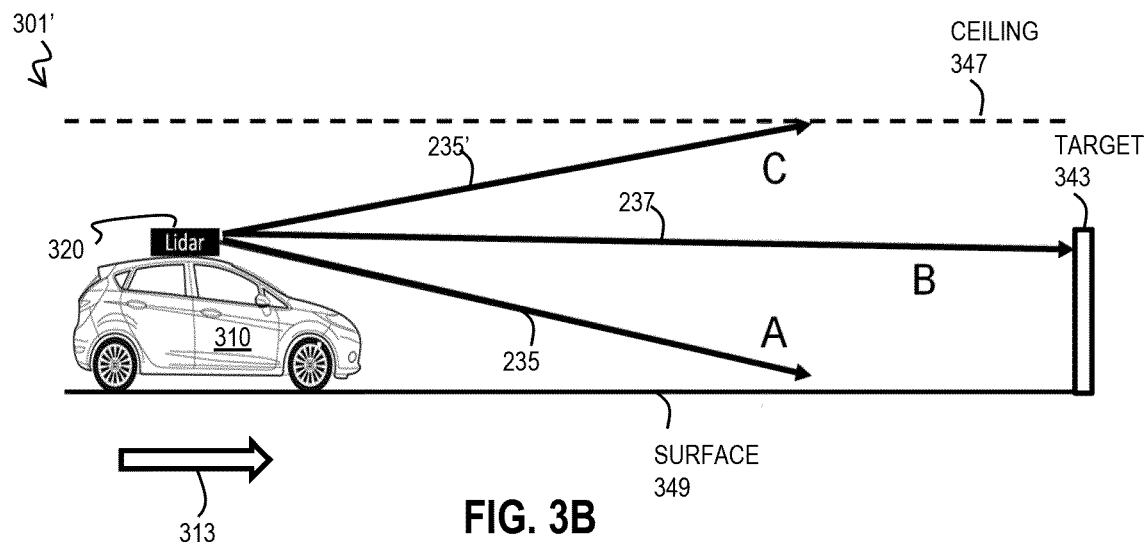
FIG. 3B is a block diagram that illustrates an example system that includes at least one hi-res LIDAR system mounted on a vehicle, according to an embodiment.

FIG. 3B is a block diagram that illustrates an example system 301' that includes at least one hi-res LIDAR system 320 mounted on the vehicle 310, according to an embodiment. The LIDAR system 320 can incorporate features of the system 200 or system 200'. The vehicle 310 can move over the surface 349 (e.g. road) with the forward direction based on the arrow 313. In an embodiment, the first plane 235 is depicted that defines the lower scan region 264 that the beam 233' is scanned by the polygon scanner 244a from the first angle to the second angle. Additionally, the second plane 237 is depicted that defines the upper scan region 262 that the beam 233' is scanned by the polygon scanner 244b from the first angle to the second angle. In an embodiment, the system 200' can be used to scan the beam 233' over a first plane 235' that intersects a ceiling 347. In this example embodiment, the scanning optics 218 is inverted from the arrangement depicted in FIG. 2J such that the first polygon scanner 244a is positioned above the second polygon scanner 244b and the first polygon scanner 244 scans the beam over the first plane 235'. In one embodiment, the first planes 235, 235' are not aligned with the surface 349 and the ceiling 347 and instead are oriented within an angle range (e.g. within ±10 degrees of the arrow 313 and/or within ±10 degrees of the second plane 237).

In designing the system 301', a predetermined maximum design range of the beams at each plane 235, 237 can be determined and can represent a maximum anticipated target range at each plane 235, 237. In one embodiment, the predetermined maximum design range is a fixed value or fixed range of values for each plane 235, 237. In an embodiment, the first plane 235 is oriented toward the surface 349 and intersects the surface 349 within some maximum design range from the vehicle 310. Thus, for the first plane 235 the system 320 does not consider targets positioned beyond the surface 349. In an example embodiment, the first plane 235 forms an angle that is about −15 degrees or in a range from about −25 degrees to about −10 degrees with respect to the arrow 313 and the maximum design range is about 4 meters (m) or within a range from about 1 m to about 10 m or in a range from about 2 m to about 6 m. In an embodiment, the first plane 235' is oriented toward the sky and intersects a ceiling 347 within some maximum design range from the vehicle 310. Thus, for the first plane 235' the system 320 does not consider targets positioned above the ceiling 347. In an example embodiment, the ceiling 347 is at an altitude of about 12 m or in a range from about 8 m to about 15 m from the surface 349 (e.g. that defines an altitude of 0 m), the first plane 235' forms an angle of about 15 degrees or in a range from about 10 degrees to about 20 degrees with respect to the arrow 313 and the maximum design range is about 7 m or within a range from about 4 m to about 10 m or within a range from about 1 m to about 15 m.

In an embodiment, the second plane 237 is oriented about parallel with the arrow 313 and intersects a target 343 positioned at a maximum design range from the vehicle 310. In one example embodiment, FIG. 3B is not drawn to scale and target 343 is positioned at a much further distance from the vehicle 310 than depicted. For purposes of this description, "about parallel" means within about ±10 degrees or within about ±15 degrees of the arrow 313. In an example embodiment, the maximum design range of the target 343 in the second plane 237 is about 200 m or within a range from about 150 m to about 300 m or within a range from about 100 m to about 500 m.

6. Method for Optimization of Scan Pattern in Coherent LIDAR System

Figure 5:
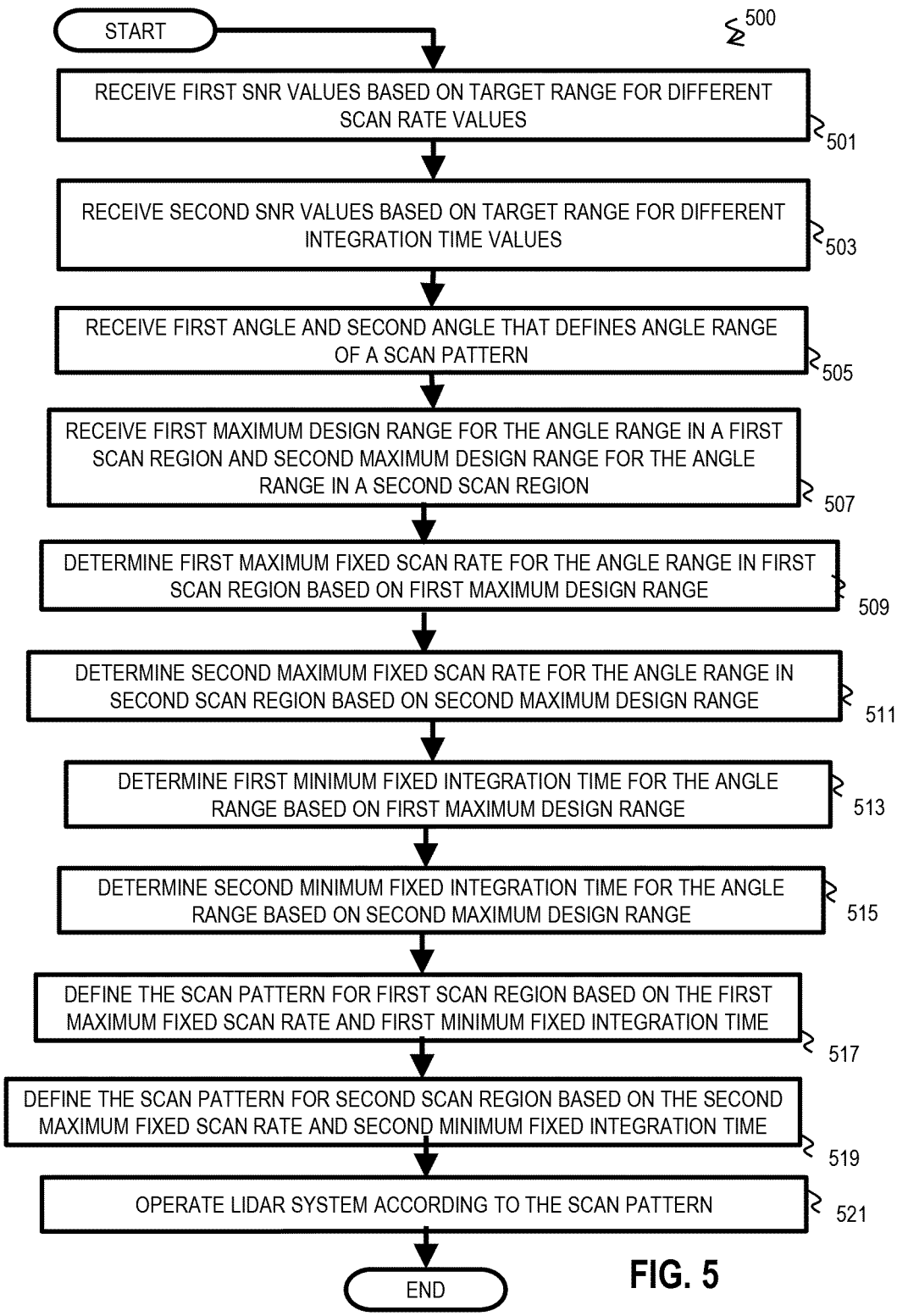
FIG. 5 is a flow chart that illustrates an example method for optimizing a scan pattern of a LIDAR system on an autonomous vehicle, according to an embodiment.
Figure 6:
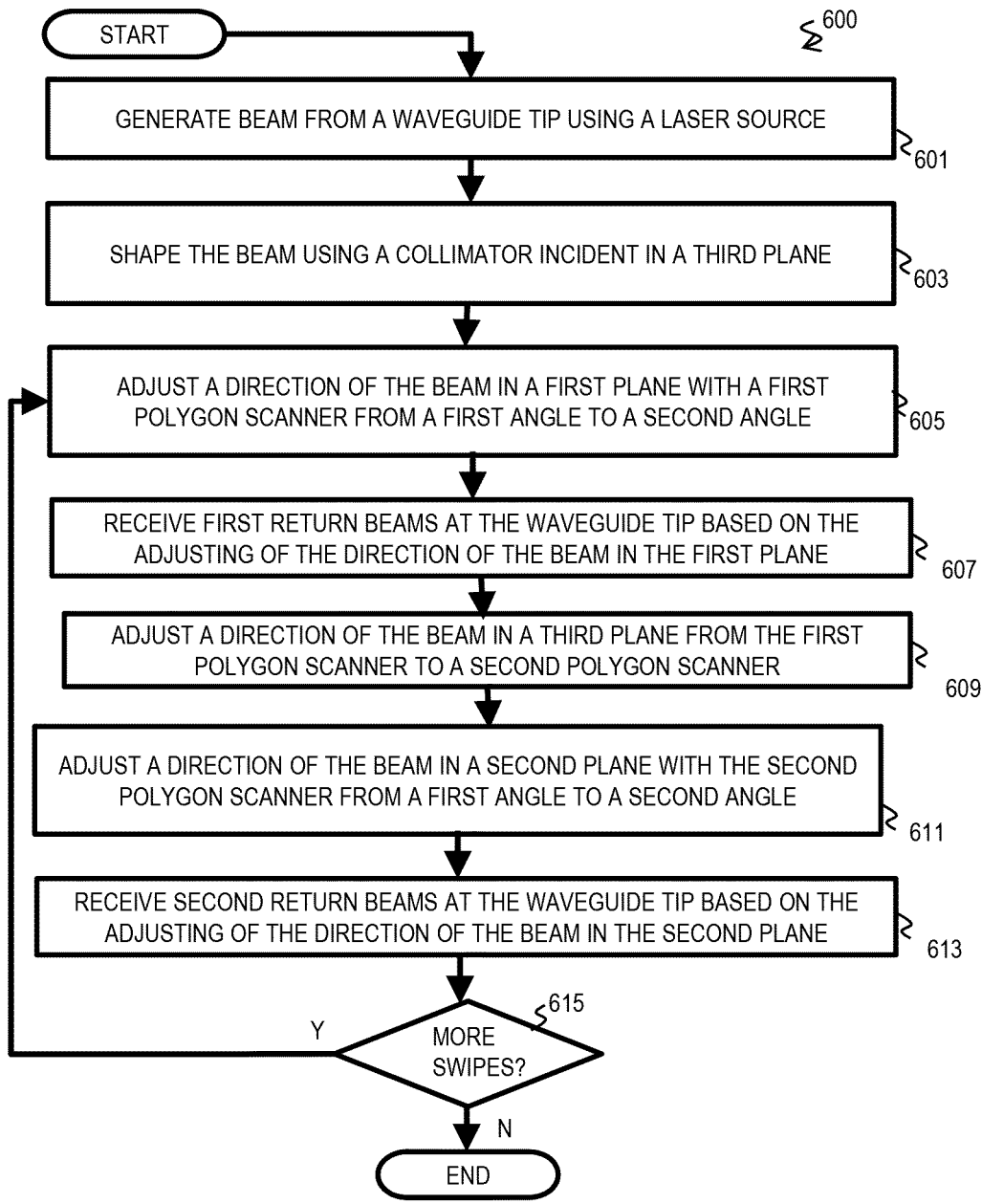
FIG. 6 is a flow chart that illustrates an example method for operating a LIDAR system on an autonomous vehicle, according to an embodiment.

FIG. 5 is a flow chart that illustrates an example method 500 for optimizing a scan pattern of a LIDAR system on an autonomous vehicle. Although steps are depicted in FIGS. 5 and 6 as integral steps in a particular order for purposes of illustration, one or more steps, or portions thereof, can be performed in a different order, or overlapping in time, in series or in parallel, or are omitted, or one or more additional steps are added, or the method is changed in some combination of ways.

In step 501, data is received on a processor that indicates first SNR values of a signal reflected by a target and detected by the LIDAR system based on values of a range of the target, where the first SNR values are for a respective value of a scan rate of the LIDAR system. In an embodiment, in step 501 the data is first SNR values of the focused return beam 291 on the fiber tip 217 in the system 200". In one embodiment, the data includes values of curve 440a and/or curve 440b and/or curve 440c that indicate SNR values of the return beam 291, where each curve 440 is for a respective value of the scan rate of the beam. In some embodiments, the data is not limited to curves 440a, 440b, 440c and includes SNR values of less or more curves than are depicted in FIG. 4G, where each SNR curve is based on a respective value of the scan rate. In some embodiments, the data includes SNR values that could be used to form the curve over the target range for each respective value of the scan rate. In an example embodiment, in step 501 the data is stored in a memory of the processing system 250 and each set of first SNR values is stored with an associated value of the scan rate of the LIDAR system. In one embodiment, in step 501 the first SNR values are obtained over a range from about 0 meters to about 500 meters (e.g. automotive vehicles) or within a range from about 0 meters to about 1000 meters (e.g. airborne vehicles) and for scan rate values from about 2000 deg/sec to about 6000 deg/sec or within a range from about 1000 deg/second to about 7000 deg/sec In some embodiments, the first SNR values are predetermined and are received by the processor in step 501. In other embodiments, the first SNR values are measured by the LIDAR system and subsequently received by the processor in step 501. In one embodiment, the data is input in step 501 using an input device 712 and/or uploaded to the memory 704 of the processing system 250 over a network link 778 from a local area network 780, internet 790 or external server 792.

In step 503, data is received on a processor that indicates second SNR values of a signal reflected by a target and detected by the LIDAR system based on values of a range of the target, where the second SNR values are for a respective value of an integration time of the LIDAR system. In an embodiment, in step 503 the data is second SNR values of the focused return beam 291 in the system 200" for a respective integration time over which the beam is processed by the acquisition system 240 and/or processing system 250. In one embodiment, the data includes values of curve 450a and/or curve 450b and/or curve 450c and/or curve 450*d* that indicate SNR values of the return beam 291, where each curve 450 is for a respective value of the integration time that the beam is processed by the acquisition system 240 and/or processing system 250. In some embodiments, the data is not limited to curves 450*a*, 450*b*, 450*c*, 450*d* and includes less or more curves than are depicted in FIG. 4H, where each SNR curve is based on a respective value of the integration time. In some embodiments, the data need not be a curve and instead is the SNR values used to form the curve over the target range for each respective value of the integration time. In an example embodiment, in step 503 the data is stored in a memory of the processing system 250 and each set of second SNR values is stored with an associated value of the integration time of the LIDAR system. In one embodiment, in step 503 the second SNR values are obtained over a range from about 0 meters to about 500 meters (e.g. automotive vehicles) or from a range from about 0 meters to about 1000 meters (e.g. airborne vehicles) and for integration time values from about 100 nanosecond (ns) to about 5 microseconds (μs). In some embodiments, the second SNR values are predetermined and are received by the processor in step 503. In some embodiments, the second SNR values are measured by the LIDAR system and subsequently received by the processor in step 503. In one embodiment, the data is input in step 503 using an input device 712 and/or uploaded to the memory 704 of the processing system 250 over a network link 778 from a local area network 780, internet 790 or external server 792.

In step 505, data is received on a processor that indicates the first angle and the second angle that defines the angle range 324. In one embodiment, in step 505 the first angle and the second angle define the angle range 324 (e.g. where the first and second angle are measured with respect to arrow 313) of the lower scan region 264 defined by the first plane 235. In another embodiment, in step 505 the first angle and the second angle define the angle range 324 of the upper scan region 262 defined by the second plane 237. In an embodiment, the first angle and second angle are symmetric with respect to the arrow 313, e.g. the first angle and the second angle are equal and opposite to each other. In an embodiment, the first angle and the second angle are about ±60 degrees with respect to the arrow 313, e.g. ±60 degrees with respect to the arrow 313 defines the angle range 324. In some embodiments, the first and second angle are about ±30 degrees, about ±40 degrees and about ±50 degrees with respect to the arrow 313. In one embodiment, steps 501, 503 and 505 are simultaneously performed in one step where the data in steps 501, 503 and 505 is received at the processor in one simultaneously step.

In step 507, data is received on a processor that indicates the maximum design range of the target along each plane 235, 237 that defines the upper and lower scan regions 262, 264. In an embodiment, the maximum design range received in step 507 is a fixed value or fixed range of values for each plane 235, 237 that defines the upper and lower scan region 262, 264. In one embodiment, in step 507 the maximum design range for the first plane 235 is in a range from about 1 m to about 15 m or from about 4 m to about 10 m. In some embodiments, in step 507 the maximum design range for the second plane 237 is in a range from about 150 m to about 300 m or in a range from about 100 m to about 400 m.

In one example embodiment, the data in step 507 is input using an input device 712 (e.g. mouse or pointing device 716) and/or are uploaded to the processing system 250 over a network link 778. In some embodiments, the maximum design range is predetermined and received during step 507. In some embodiments, the system 200, 200', 200" is used to measure the maximum design range at each plane 235, 237 and the maximum design range at each plane 235, 237 is subsequently received by the processing system 250 in step 507.

In step 509, a maximum scan rate of the LIDAR system is determined at the first plane 235 so that the SNR of the LIDAR system is greater than a minimum SNR threshold. At the first plane 235, the maximum design range for that plane is first determined based on the received data in step 507. First SNR values received in step 501 are then determined for the maximum design range at the plane 235 and it is further determined which of these first SNR values exceed the minimum SNR threshold. In one embodiment, values of curves 440*a*, 440*b*, 440*c* are determined for a maximum design range (e.g. about 120 m) and it is further determined that the values of curves 440*a*, 440*b* exceeds the minimum SNR threshold 442. Among those first SNR values which exceed the minimum SNR threshold, the first SNR values with the maximum scan rate is selected and the maximum scan rate is determined in step 509 for the plane 235. In the above embodiment, among the values of the curves 440*a*, 440*b* which exceeds the minimum SNR threshold 442 at the maximum design range (e.g. about 120 m), the curve 440*b* values are selected as the maximum scan rate and the maximum scan rate (e.g. moderate scan rate associated with curve 440*b*) is determined in step 509 for the plane 235. In step 511, step 509 is repeated but the maximum scan rate is determined for the second plane 237.

In an embodiment, FIG. 4G depicts that the maximum scan rate determined in step 509 for the first plane 235 with a smaller maximum design range (e.g. fast scan rate based on curve 440*c*) is greater than the maximum scan rate for second plane 237 with a larger maximum design range (e.g. moderate scan rate based on curve 440*b*) determined in step 511. Thus, the rotation speed of the first polygon scanner 244*a* (e.g. scans the beam 233' in the first plane 235 along the lower scan region 264) is set to be larger than the rotation speed of the second polygon scanner 244*b* (e.g. scans the beam 233' in the second plane 237 along the upper scan region 262). In an example embodiment, the gearing structure of the scanning optics 218 (FIG. 2I) is arranged so that the ratio of the rotation speed of the first polygon scanner 244*a* to the rotation speed of the second polygon scanner 244*b* has the appropriate value based on steps 509, 511. In an embodiment, the step of determining the maximum scan rate in steps 509 and 511 ensures that beam walkoff 419 (FIG. 4E) of the return beam 291 on the fiber tip 217 is less than a ratio of a diameter of the image 418 of the return beam 291 on the tip 217. In an example embodiment, the ratio is about 0.5 or in a range from about 0.3 to about 0.7.

In step 513, a minimum integration time of the LIDAR system is determined at the first plane 235 so that the SNR of the LIDAR system is greater than a minimum SNR threshold. At the first plane 235, the maximum design range for that plane is first determined based on the received data in step 507. Second SNR values received in step 503 are then determined for the maximum design range at the plane 235 and it is further determined which of these second SNR values exceed the minimum SNR threshold. In one embodiment, values of curves 450*a*, 450*b*, 450*c*, 450*d* are determined for a maximum design range (e.g. about 120 m) and it is further determined that the values of curves 450*a*, 450*b*, 450*c* exceeds the minimum SNR threshold 452. Among those second SNR values which exceed the minimum SNR threshold, the second SNR values with the minimum integration time is selected and the minimum integration time is determined in step 513 for that plane 235. In the above embodiment, among the values of the curves 450a, 450b, 450c which exceeds the minimum SNR threshold 452 at the maximum design range (e.g. about 120 m), the curve 450c values are selected with the minimum integration time and the minimum integration time (e.g. about 800 ns) is determined in step 511 for the plane 235. Step 515 involves repeating step 513 to determine the minimum integration time for the second plane 237.

In step 517, a scan pattern of the lower scan region 264 in the LIDAR system is defined based on the maximum scan rate from step 509 and the minimum integration time from step 513. In an embodiment, the maximum scan rate and the minimum integration time are fixed over the lower scan region 264. In an example embodiment, the scan pattern is stored in a memory (e.g. memory 704) of the processing system 250. In step 519, the scan pattern of the upper scan region 262 is defined based on the maximum scan rate from step 511 and the minimum integration time from step 515.

In step 521, the LIDAR system is operated according to the scan pattern determined in steps 517 and 519. In an embodiment, in step 519 the beam of the LIDAR system is scanned in the field of view 324 over the lower scan region 264 and the upper scan region 262. In some embodiments, step 521 involves using the system 200″ of FIGS. 2E-2F and scanning the beam 233′ over the lower scan region 264 followed by the upper scan region 262 as the scanner 241 moves the beam 233 from the first polygon scanner 244a to the second polygon scanner 244b. In another embodiment, step 521 involves using the system 200″ of FIGS. 2G-2H and simultaneously scanning the beams 233′ over the lower scan region 264 and upper scan region 262. In an embodiment, in step 521 the beam 233′ is counter scanned over the upper scan region 262 and lower scan region 264 since the beam 233′ is scanned in opposite directions. This advantageously improves the net resulting moment due to inertial changes of the scanning optics 218 during step 521 due to the counter rotation of the scanners 244a, 244b. In an embodiment, in step 521 the beam is scanned through the upper scan region 262 and lower scan region 264 over one or more cycles, where the scan rate of the beam in each region 262, 264 is the maximum scan rate in the scan pattern for that region 262, 264 (e.g. plane 235, 237) and the integration time of the LIDAR system at each region 262, 264 is the minimum integration time for that region 262, 264 (e.g. plane 235, 237).

During or after step 521, the processor can operate the vehicle 310 based at least in part on the data collected by the LIDAR system during step 521. In one embodiment, the processing system 250 of the LIDAR system and/or the processor 314 of the vehicle 310 transmit one or more signals to the steering and/or braking system of the vehicle based on the data collected by the LIDAR system in step 521. In one example embodiment, the processing system 250 transmits one or more signals to the steering or braking system of the vehicle 310 to control a position of the vehicle 310 in response to the LIDAR data. In some embodiments, the processing system 250 transmits one or more signals to the processor 314 of the vehicle 310 based on the LIDAR data collected in step 521 and the processor 314 in turn transmits one or more signals to the steering and braking system of the vehicle 310.

FIG. 6 is a flow chart that illustrates an example method 600 for operating a LIDAR system 200″ on an autonomous vehicle, according to an embodiment. In step 601, the beam 201 is generated from the laser source 212. In an embodiment, in step 601 the beam 201 is coupled into the transmission waveguide 225 and transmitted from the tip 217 of the waveguide 225. In some embodiments, in step 601 the beam 201 is split using a beam splitter (not shown) and the separate beams are directed into the waveguides 225a, 225b and are transmitted from tips 217 of the waveguides 225a, 225b. In some embodiments, in step 601 two laser sources 212 are provided and each laser source 212 generates a respective beam 201 that is directed into a respective waveguide 225a, 225b.

In step 603, the beam is shaped with the collimator 229 to form a collimated beam 205′. In an embodiment, in step 603 the beam is shaped with the collimator 229 to form the collimated beam 205′ that is oriented in a third plane 234 (e.g. plane of FIGS. 2E, 2G). In some embodiments, in step 603 separate beams are transmitted from tips 217 of the waveguides 225a, 225b and respective collimators 229a, 229b collimate the beams into respective collimated beams 205′ that are oriented in the third plane 234 (e.g. plane of FIG. 2G). In an embodiment, in step 603 the collimated beam 205′ is directed within the third plane 234 in a direction toward one of the polygon scanners 244a, 244b (FIG. 2E-2F) or toward both of the polygon scanners 244a, 244b (FIGS. 2G-2H).

In step 605, a direction of the collimated beam 205′ generated in step 603 is adjusted in the first plane 235 with the first polygon scanner 244a from the first angle to the second angle in the first plane 235. In an embodiment, in step 605 the beam 233′ is scanned over the lower scan region 264 based on the rotation of the first polygon scanner 244a around the rotation axis 243. In an embodiment, in step 605 the scanner 241 directs the beam 233 onto the facets 245 of the first polygon scanner 244a for a period of time that is sufficient to scan the beam 233′ with the first polygon scanner 244a from the first angle to the second angle. In an example embodiment, for the system 301′, step 605 involves scanning the beam 233′ from the first angle to the second angle over the first plane 235 that is oriented toward the surface 349.

In step 607, one or more return beams 291 are received at the waveguide tip 217 of the system 200″ based on the adjusting of the direction of the beam 233′ in the first plane 235 in step 605. In an embodiment, in step 607 the return beams 291 are processed by the system 200″ in order to determine a range to the target over the lower scan region 264. In an example embodiment, in step 607 the return beams 291 are reflected from the surface 349 (or a target on the surface 349) based on the adjusting of the direction of the scanned beam 233′ in the first plane 235.

In step 609, the direction of the beam 205′ is adjusted in the third plane 234 (plane of FIG. 2E) from the first polygon scanner 244a to the second polygon scanner 244b. In an embodiment, in step 609 the direction of the beam 205′ is adjusted with the scanner 241 at a continuous scan speed that is sufficiently slow that steps 605 and 607 are performed as the beam 205′ is on the facets 245 of the first polygon scanner 244a. In an embodiment, in step 609 the direction of the beam 205′ is adjusted with the scanner 241 at a non-zero scan speed between the scanners 244a, 244b and is held fixed on each of the scanners 244a, 244b until steps 605, 607 (for scanner 244a) or steps 611, 613 (for scanner 244b) is performed. In some embodiments, where separate beams 205′ are transmitted onto the separate polygons scanners 244a, 244b (e.g. FIGS. 2G-2H), step 609 is omitted.

In step 611, a direction of the collimated beam 205′ generated in step 603 is adjusted in the second plane 237 with the second polygon scanner 244a from the first angle to the second angle in the second plane 237. In an embodiment, in step 611 the beam 233′ is scanned over the upper scan region 262 based on the rotation of the second polygon scanner 244b around the rotation axis 243. In an embodiment, in step 611 the scanner 241 directs the beam 233 onto the facets 245 of the second polygon scanner 244b for a period of time that is sufficient to scan the beam 233' with the second polygon scanner 244b from the first angle to the second angle. In an example embodiment, for the system 301', step 611 involves scanning the beam 233' from the first angle to the second angle over the second plane 237 that is oriented toward the target 343 on the surface 349 (e.g. at a maximum range from about 150 m to about 400 m). In an embodiment, the direction of the adjusting of the beam 233' in the second plane 237 in step 611 is opposite to the direction of the adjusting of the beam 233' in the first plane 235 in step 605.

In step 613, one or more return beams 291 are received at the waveguide tip 217 of the system 200" based on the adjusting of the direction of the beam 233' in the second plane 237 in step 611. In an embodiment, in step 613 the return beams 291 are processed by the system 200" in order to determine a range to the target over the upper scan region 262. In an example embodiment, in step 613 the return beams 291 are reflected from the target 343 based on the adjusting of the direction of the scanned beam 233' in the second plane 237.

In step 615, it is determined whether more swipes of the beam 233' in the first plane 235 and/or second plane 237 are to be performed. In an embodiment, step 615 involves comparing a number of swipes of the beam 233' in the first plane 235 and/or second plane 237 with a predetermined number of swipes of the beam 233' in the first plane and/or second plane 237 (e.g. stored in the memory 704). If additional swipes of the beam 233' are to be performed, the method 600 moves back to step 605. If additional swipes of the beam 233' are not to be performed, the method 600 ends. In one embodiment, the polygon scanners 244a, 244b continuously rotate at fixed speeds during the steps of the method 600. In one embodiment, when the method 600 ends the processing system 250 transmits a signal to the polygon scanners 244a, 244b to stop the rotation of the scanners.

In an embodiment, the method 600 further includes determining a range to the target in the first plane 235 and/or second plane 237 based on the return beam data received in steps 607 and 611. Additionally, in one embodiment, the method 600 includes adjusting one or more systems of the vehicle 310 based on the range to the target in the first and second plane 235, 237. In an example embodiment, the method 600 includes adjusting one or more of the steering system and/or braking system of the vehicle 310 based on the target range data that is determined from the return beam data in steps 607 and 611.

7. Computational Hardware Overview

Figure 7:
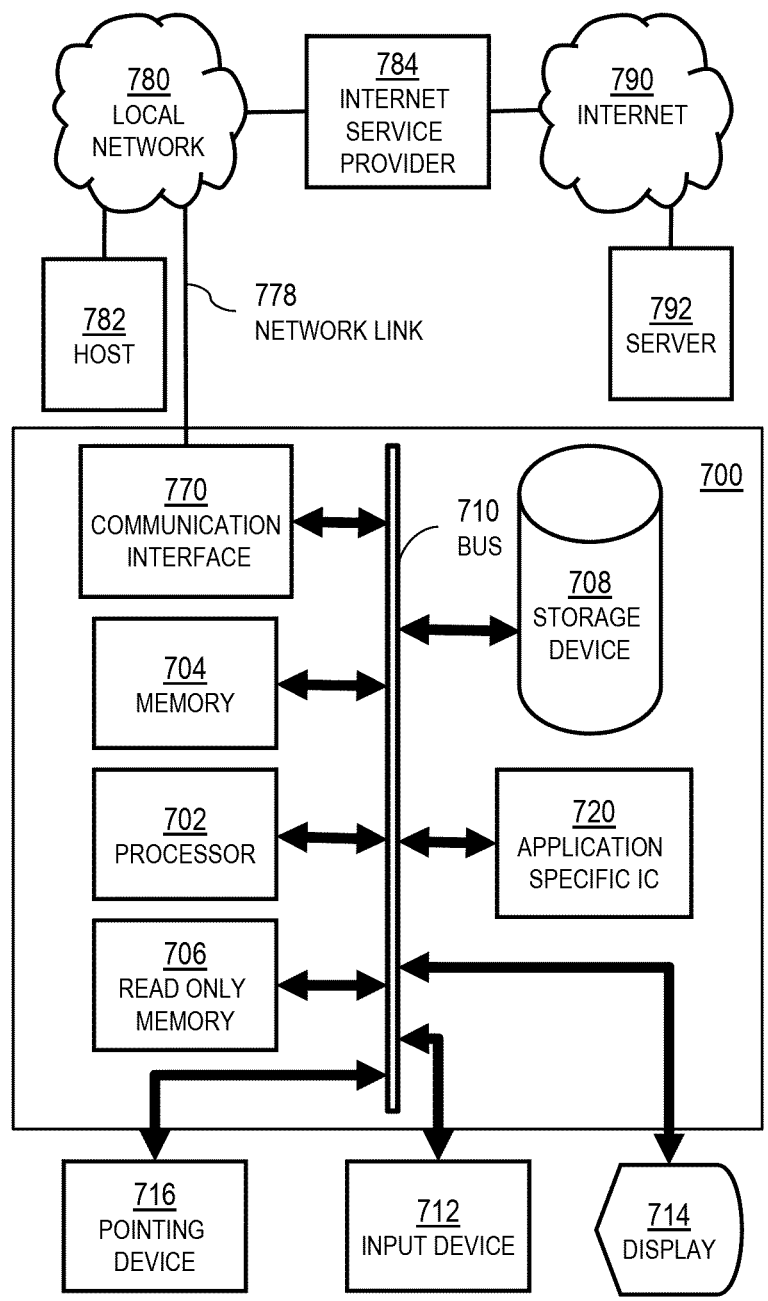
FIG. 7 is a block diagram that illustrates a computer system upon which an embodiment of the invention may be implemented.

FIG. 7 is a block diagram that illustrates a computer system 700. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The computer system 700 can implement various techniques described herein in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
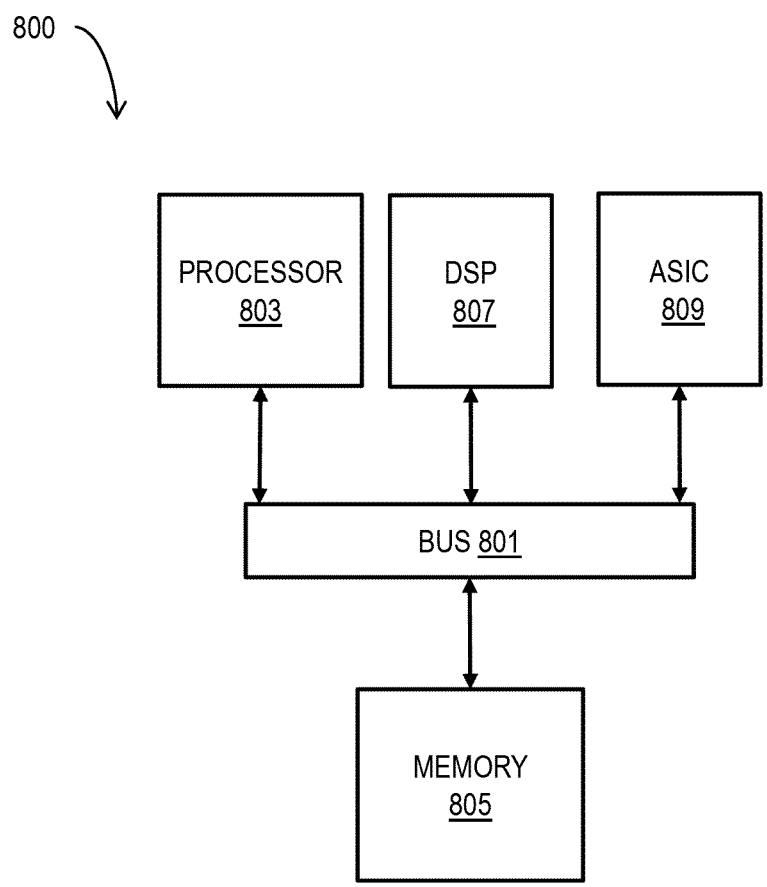
FIG. 8 illustrates a chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. An apparatus, comprising:
   a motor;
   a first scanner coupled to the motor, the motor configured to rotate the first scanner at a first angular velocity about a rotation axis to deflect a first beam incident in a third plane on the first scanner into a first plane different from the third plane; and
   a second scanner coupled to the motor, the motor configured to rotate the second scanner at a second angular velocity different from the first angular velocity about the rotation axis to deflect a second beam incident in the third plane on the second scanner into a second plane different from the third plane;
   wherein the first beam is generated by a laser source.

2. The apparatus of claim 1, wherein the first scanner is a first polygon scanner and the second scanner is a second polygon scanner.

3. The apparatus of claim 1, wherein:
   the first scanner is configured to deflect the first beam from a first angle in the first plane to a second angle in the first plane less than or equal to sixty degrees from the first angle in the first plane; and
   the second scanner is configured to deflect the second beam from a first angle in the second plane to a second angle in the second plane less than or equal to sixty degrees from the first angle in the second plane.

4. The apparatus of claim 1, wherein the first scanner is configured to rotate in a different direction than the second scanner.

5. The apparatus of claim 1, wherein the first scanner is configured to scan a first region and the second scanner is configured to scan a second region, the first region below the second region relative to the third plane.

6. The apparatus of claim 1, further comprising a third scanner configured to adjust a direction of the first beam from the first scanner to the second scanner.

7. The apparatus of claim 1, wherein the motor comprises a drive shaft and a planetary bearing mounted to the first scanner through a recess of the first scanner that receives the drive shaft and the planetary bearing, and wherein the apparatus further comprises:
   a plurality of planetary transmission gears;
   a driver sun gear; and
   a ring gear, the plurality of planetary transmission gears and the driver sun gear positioned within the ring gear, the second scanner mounted to the first scanner by the plurality of planetary transmission gears and the driver sun gear, at least one parameter of at least one of the plurality of transmission gears, the driver sun gear, or the ring selected to configure a ratio of a magnitude of a rotation speed of the first scanner to a magnitude of a rotation speed of the second scanner to be greater than 1.

8. The apparatus of claim 1, wherein the first scanner is configured to scan the first beam over a first time period and the second scanner is configured to scan the second beam over a second time period after the first time period.

9. The apparatus of claim 1, wherein a rotation speed of the first angular velocity is in a range from about 1000 revolutions per minute (rpm) to about 5000 rpm and a rotation speed of the second angular velocity is in a range from about 200 rpm to about 1000 rpm.

10. The apparatus of claim 1, wherein the motor comprises a first motor configured to rotate the first scanner and a second motor configured to rotate the second scanner.

11. The apparatus of claim 1, wherein:
   the apparatus is mounted to an autonomous vehicle, the apparatus further comprising a waveguide configured to receive at least one return beam corresponding to at least one of the first beam or the second beam and provide a signal corresponding to the at least one return beam to a vehicle controller; and
   the vehicle controller is configured to control at least one of a direction or a speed of the autonomous vehicle responsive to the signal corresponding to the at least one return beam.

12. A system, comprising:
   a laser source;
   at least one waveguide configured to receive a first beam from the laser source and emit the first beam at a tip of the at least one waveguide;
   at least one collimator configured to collimate the first beam from each respective at least one waveguide into a third plane;
   a motor;
   a first scanner coupled to the motor, the motor configured to rotate the first scanner to deflect a second beam corresponding to the first beam into a first plane different from the third plane; and
   a second scanner coupled to the motor, the motor configured to rotate the second scanner to deflect a third beam corresponding to the first beam into a second plane different from the third plane.

13. The system of claim 12, wherein:
   the at least one waveguide includes a first waveguide and a second waveguide; and
   the at least one collimator includes a first collimator configured to collimate the first beam from the first waveguide to be incident on the first scanner and a second collimator configured to collimate the first beam from the second waveguide to be incident on the second scanner.

14. The system of claim 12, wherein:
the first scanner is configured to deflect the second beam from a first angle in the first plane to a second angle in the first plane less than or equal to sixty degrees from the first angle in the first plane; and
the second scanner is configured to deflect the third beam from a first angle in the second plane to a second angle in the second plane less than or equal to sixty degrees from the first angle in the second plane.

15. The system of claim 12, wherein the first scanner is configured to rotate in a different direction than the second scanner.

16. The system of claim 12, further comprising a third scanner configured to adjust a direction of the first beam from the first scanner to the second scanner.

17. The system of claim 12, wherein the motor comprises a drive shaft and a planetary bearing mounted to the first scanner through a recess of the first scanner that receives the drive shaft and the planetary bearing, and wherein the apparatus further comprises:
a plurality of planetary transmission gears;
a driver sun gear; and
a ring gear, the plurality of planetary transmission gears and the driver sun gear positioned within the ring gear, the second scanner mounted to the first scanner by the plurality of planetary transmission gears and the driver sun gear, at least one parameter of at least one of the plurality of transmission gears, the driver sun gear, or the ring selected to configure a ratio of a magnitude of a rotation speed of the first scanner to a magnitude of a rotation speed of the second scanner to be greater than 1.

18. The system of claim 12, wherein the first scanner is configured to scan the second beam over a first time period and the second scanner is configured to scan the third beam in the second plane over a second time period after the first time period.

19. The system of claim 12, wherein a rotation speed of the first scanner is in a range from about 1000 revolutions per minute (rpm) to about 5000 rpm and a rotation speed of the second scanner is in a range from about 200 rpm to about 1000 rpm.

20. The system of claim 12, wherein:
the at least one waveguide is further configured to receive at least one return beam corresponding to at least one of the second beam or the third beam and provide a signal corresponding to the at least one return beam to a vehicle controller; and
the vehicle controller controls at least one of a direction or a speed of the vehicle responsive to the signal corresponding to the at least one return beam.

* * * * *

UNITED STATES PATENT AND TRADEMARK OFFICE
CERTIFICATE OF CORRECTION

PATENT NO. : 10,838,045 B2
APPLICATION NO. : 16/590316
DATED : November 17, 2020
INVENTOR(S) : Stephen C. Crouch, Edward Joseph Angus and Michelle Milvich Page 1 of 1

It is certified that error appears in the above-identified patent and that said Letters Patent is hereby corrected as shown below:

On the Title Page

Please update the section of the Applicant and Assignee, as follows:
(71) Applicant: AURORA OPERATIONS, INC., PITTSBURGH, PA (US)
(73) Assignee: AURORA OPERATIONS, INC., PITTSBURGH, PA (US)

Signed and Sealed this
Twenty-third Day of April, 2024

Katherine Kelly Vidal
*Director of the United States Patent and Trademark Office*